US012795612B2

(12) United States Patent
Zhao et al.

(10) Patent No.: US 12,795,612 B2
(45) Date of Patent: Nov. 10, 2026

(54) CARRIER SELECTION METHOD AND DEVICE, TERMINAL, AND STORAGE MEDIUM

(71) Applicant: GUANGDONG OPPO MOBILE TELECOMMUNICATIONS CORP., LTD., Dongguan (CN)

(72) Inventors: Zhenshan Zhao, Dongguan (CN); Shichang Zhang, Dongguan (CN); Huei-Ming Lin, Taipei (TW); Yi Ding, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 369 days.

(21) Appl. No.: 18/370,086

(22) Filed: Sep. 19, 2023

(65) Prior Publication Data

US 2024/0031994 A1 Jan. 25, 2024

Related U.S. Application Data

(63) Continuation of application No. PCT/CN2021/085089, filed on Apr. 1, 2021.

(51) Int. Cl.
*H04W 72/02* (2009.01)
*H04W 72/0453* (2023.01)
*H04W 72/543* (2023.01)

(52) U.S. Cl.
CPC ....... *H04W 72/02* (2013.01); *H04W 72/0453* (2013.01); *H04W 72/543* (2023.01)

(58) Field of Classification Search
None
See application file for complete search history.

(56) References Cited

U.S. PATENT DOCUMENTS

| | | | | |
|---|---|---|---|---|
| 12,052,662 | B2 * | 7/2024 | Kung | H04W 72/0446 |
| 2020/0205165 | A1 * | 6/2020 | Huang | H04L 5/0051 |
| 2020/0205166 | A1 * | 6/2020 | Huang | H04W 68/005 |
| 2020/0229171 | A1 * | 7/2020 | Khoryaev | H04W 4/40 |
| 2020/0351033 | A1 * | 11/2020 | Ryu | H04L 1/1854 |
| 2021/0051675 | A1 * | 2/2021 | Lu | H04W 72/0453 |
| 2021/0344460 | A1 * | 11/2021 | Park | H04W 4/40 |
| 2022/0086860 | A1 * | 3/2022 | Panteleev | H04L 5/0042 |
| 2022/0110094 | A1 * | 4/2022 | Huang | H04L 1/1864 |
| 2022/0190966 | A1 * | 6/2022 | Hosseini | H04W 72/02 |

(Continued)

FOREIGN PATENT DOCUMENTS

| | | | |
|---|---|---|---|
| CN | 109392015 | A | 2/2019 |
| CN | 110754119 | A | 2/2020 |

(Continued)

OTHER PUBLICATIONS

Ericsson "Sidelink Carrier Selection Criteria"3GPP TSG-RAN WG2 #99bis Tdoc R2-1711493, Oct. 13, 2017 (Oct. 13, 2017),entire document, 6 pages.

(Continued)

*Primary Examiner* — Suk Jin Kang
(74) *Attorney, Agent, or Firm* — BAYES PLLC

(57) ABSTRACT

A carrier selection method, a carrier selection device, and a storage medium are provided. The method includes that: a first device selects a carrier according to related information for sidelink communication.

18 Claims, 15 Drawing Sheets

(56) References Cited

U.S. PATENT DOCUMENTS

| | | | | |
|---|---|---|---|---|
| 2022/0200737 | A1* | 6/2022 | Hosseini | H04L 1/1819 |
| 2022/0217722 | A1* | 7/2022 | Wang | H04W 74/0808 |
| 2022/0272726 | A1* | 8/2022 | Wang | H04L 1/1812 |
| 2022/0303949 | A1* | 9/2022 | Hosseini | H04L 5/0044 |
| 2022/0311582 | A1* | 9/2022 | Ye | H04W 76/14 |
| 2022/0312389 | A1* | 9/2022 | Li | H04W 28/26 |
| 2022/0329368 | A1* | 10/2022 | Zhao | H04W 72/0453 |
| 2022/0345277 | A1* | 10/2022 | Ryu | H04L 5/0007 |
| 2022/0353849 | A1* | 11/2022 | Liu | H04W 72/02 |
| 2022/0393837 | A1* | 12/2022 | Yang | H04L 5/0055 |
| 2022/0400477 | A1* | 12/2022 | Lee | H04L 1/1887 |
| 2023/0022748 | A1* | 1/2023 | Liang | H04L 1/1861 |
| 2023/0136864 | A1* | 5/2023 | Lei | H04L 5/0055 370/329 |
| 2023/0189218 | A1* | 6/2023 | Shin | H04W 72/25 370/329 |
| 2023/0254096 | A1* | 8/2023 | Hosseini | H04L 5/0053 370/329 |
| 2023/0262660 | A1* | 8/2023 | Park | H04L 5/0094 370/329 |
| 2023/0309118 | A1* | 9/2023 | Peng | H04W 72/02 |
| 2024/0098793 | A1* | 3/2024 | Hosseini | H04W 72/56 |

FOREIGN PATENT DOCUMENTS

| | | | |
|---|---|---|---|
| CN | 111464953 | A | 7/2020 |
| CN | 112188633 | A | 1/2021 |
| EP | 3672337 | A2 | 6/2020 |
| EP | 4087309 | A1 | 11/2022 |
| WO | 2019096275 | A1 | 5/2019 |
| WO | 2020221703 | A1 | 11/2020 |
| WO | 2022133411 | A1 | 6/2022 |

OTHER PUBLICATIONS

Huawei et al. "Discussion on Resource Selection for Sidelink CA", 3GPP TSG-RAN WG4 Meeting #85, R4-1712984, Dec. 1, 2017 (Dec. 1, 2017),entire document, 2 pages.

International Search Report in the international application No. PCT/CN2021/085089, mailed on Jan. 4, 2022, 6 pages with English translation.

English translation of the Written Opinion of the International Search Authority in the international application No. PCT/CN2021/085089, mailed on Jan. 4, 2022, 6 pages with English translation.

"3rd Generation Partnership Project;Technical Specification Group Radio Access Network;NR;Physical layer procedures for control(Release 16)", 3GPP TS 38.213 V16.4.0 (Dec. 2020), cited in clause 16.3, 181 pages.

CMCC: "Discussion on HARQ feedback for NR v2X", 3GPP Draft; R1-1910164, 3rd Generation Partnership Project (3GPP), Mobile Competence Centre; 650, Route Des Lucioles; F-06921 Sophia-Antipolis Cedex; France vol. RAN WG1, No. Chongqing, China; Oct. 14-Oct. 20, 2019, Oct. 1, 2019 (Oct. 1, 2019), XP051808023, sections 1-4. 6 pages.

Supplementary European Search Report in the European application No. 21934028.8, mailed on Apr. 10, 2024. 16 pages.

* cited by examiner z carrier are selected from candidate carriers, z does not exceed the number of carriers where a data transmitting terminal supports simultaneous transmission of sidelink data, or z does not exceed the number of carriers where the first terminal supports simultaneous reception of sidelink data, and z is an integer greater than 1 (328)

FIG. 36

A carrier belonging to a subset of a carrier set selected by a data receiving terminal is selected from the carrier set (329)

FIG. 37

A carrier is selected from candidate carriers according to a first correspondence between a service type of to-be-transmitted data and the carrier (330)

FIG. 38

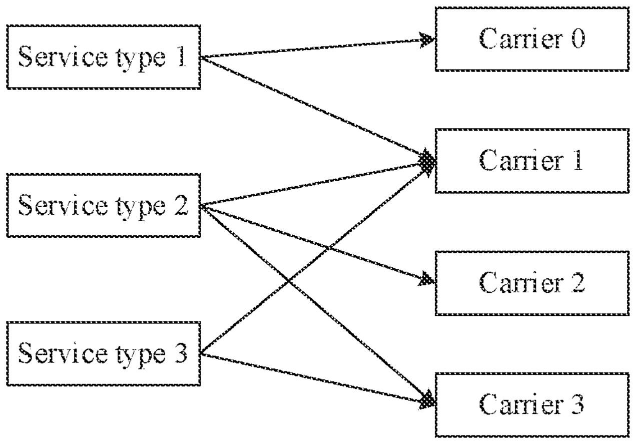

FIG. 39

An eleventh carrier is selected from candidate carriers, periods supported by the eleventh carrier include a period of to-be-transmitted data (331)

FIG. 40

CARRIER SELECTION METHOD AND DEVICE, TERMINAL, AND STORAGE MEDIUM

CROSS-REFERENCE TO RELATED APPLICATION

This is a continuation application of International Patent Application No. PCT/CN2021/085089, filed on Apr. 1, 2021, the content of which is hereby incorporated by reference in its entirety.

BACKGROUND

In order to improve throughput of a sidelink transmission system, a multi-carrier transmission may be supported on sidelink, and data of a terminal may be transmitted on one or more carriers, therefore, there is a problem of selection of carriers for transmission.

A sidelink multi-carrier transmission is introduced into a NewRadio Sidelink (NR SL) system, and how to perform carrier selection is a to-be-solved problem.

SUMMARY

The disclosure relate to the technical field of mobile communication, and in particular to a carrier selection method and device, a terminal, and a storage medium.

Embodiments of the disclosure provide a carrier selection method and device, a terminal, and a storage medium, which may reasonably select a carrier in a sidelink multi-carrier transmission scenario. Technical solutions are as follows.

According to an aspect of the disclosure, there is provided a carrier selection method, including the following operations.

A carrier is selected according to related information of a sidelink communication.

According to an aspect of the disclosure, there is provided a carrier selection device, including a processor.

The processor is configured to select a carrier according to related information of a sidelink communication.

According to an aspect of the disclosure, there is provided a non-transitory computer-readable storage medium, having stored thereon executable instructions. The executable instructions are loaded and executed by a processor to implement the carrier selection method, the method includes the following operations.

A carrier is selected according to related information of a sidelink communication.

BRIEF DESCRIPTION OF THE DRAWINGS

In order to explain the technical solutions in the embodiments of the disclosure more clearly, the drawings required to be used in descriptions of the embodiments will be briefly introduced below, and it is apparent that the drawings in the following descriptions are merely some embodiments of the disclosure, and other drawings may also be obtained by those of ordinary skill in the art according to these drawings without paying any creative work.

FIG. 36 is a flowchart of a carrier selection method according to an exemplary embodiment of the disclosure.

FIG. 37 is a flowchart of a carrier selection method according to an exemplary embodiment of the disclosure.

FIG. 38 is a flowchart of a carrier selection method according to an exemplary embodiment of the disclosure.

FIG. 39 is a schematic diagram of correspondences between service types and carriers according to an exemplary embodiment of the disclosure.

FIG. 40 is a flowchart of a carrier selection method according to an exemplary embodiment of the disclosure.

DETAILED DESCRIPTION

In order to make objectives, technical solutions and advantages of the disclosure clearer, the embodiments of the disclosure will be further described in detail below with reference to the drawings.

Firstly, terms involved in the embodiments of the disclosure are briefly introduced.

Vehicle to everything (V2X): it is a key technology of a future intelligent transportation system, and mainly researches a solution of vehicle data transmission based on a 3rd Generation Partnership Project (3GPP) communication protocol. V2X communications include Vehicle to Vehicle (V2V) communication, Vehicle to Infrastructure (V2I) communication, and Vehicle to Pedestrian (V2P) communication. Application of the V2X will improve driving safety, reduce congestion and vehicle energy consumption, improve traffic efficiency, or the like.

Sidelink (SL) transmission technology: different from receiving or transmitting communication data by an access network device in a traditional cellular system, SL transmission refers to directly preforming communication data transmission between terminal devices through SL. With regard to SL transmission, 3 GPP defines two transmission modes: Mode A and Mode B. Mode A: transmission resources of a SL User Equipment (UE) are allocated by the access network device, and the SL UE preforms communication data transmission on the SL according to the transmission resources allocated by the access network device, here, the access network device may not only allocate transmission resources for a single transmission to the SL UE, but also allocate transmission resources for a semi-persistent transmission to the SL UE. Mode B: the SL UE selects one or more transmission resources from a resource pool, to preform communication data transmission, and the SL UE may select transmission resources from the resource pool in a listening manner, or select transmission resources from the resource pool in a random selection manner.

Figure 1:
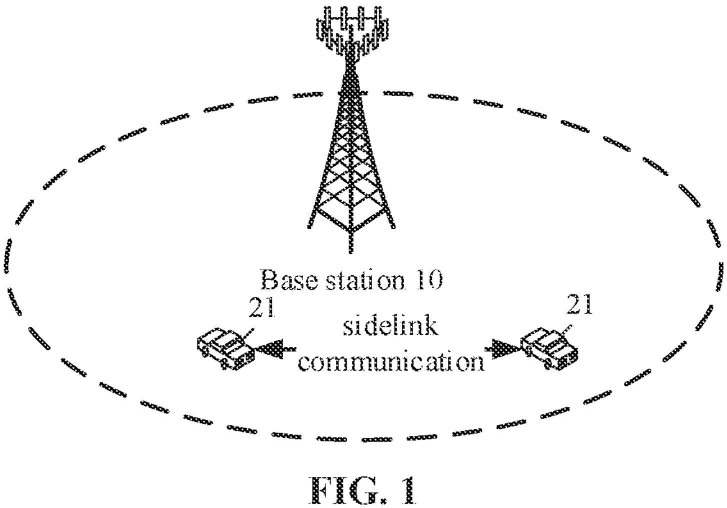
FIG. 1 is a schematic diagram of a sidelink transmission in a related art of the disclosure.
Figure 2:
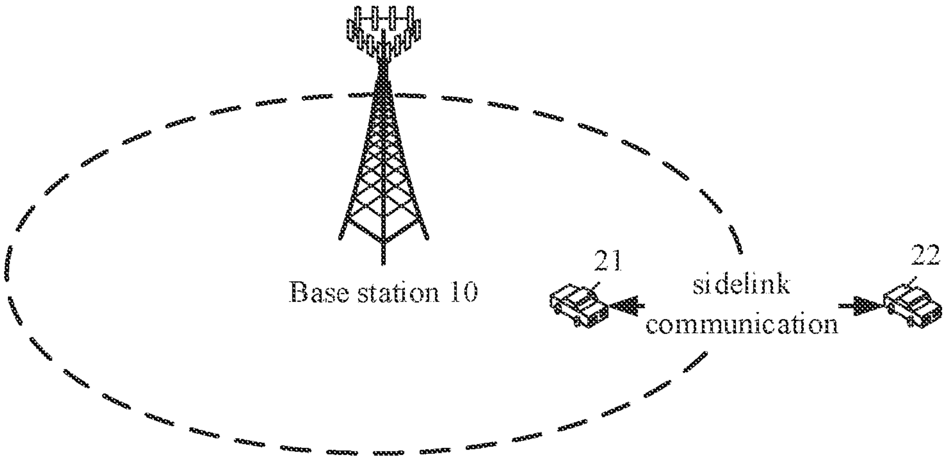
FIG. 2 is a schematic diagram of a sidelink transmission in a related art of the disclosure.
Figure 3:
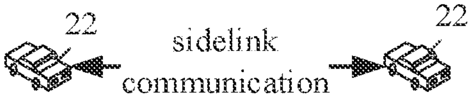
FIG. 3 is a schematic diagram of a sidelink transmission in a related art of the disclosure.

In the SL transmission, according to a network coverage situation where a terminal performing communication is located, there may be a SL communication within the network coverage, a SL communication within part of the network coverage, and a SL communication outside the network coverage, as illustrated in FIG. 1, FIG. 2 and FIG. 3 respectively.

FIG. 1: during the SL communication within the network coverage, all terminals 21 performing the SL communication are within a coverage range of the same base station 10, so that each of the terminals 21 may perform the SL communication based on the same SL configuration by receiving configuration signaling from the base station 10.

FIG. 2: in case of the SL communication within part of the network coverage, part terminal 21 performing the SL communication is within a coverage range of a base station, and this part terminal 21 may receive configuration signaling from the base station 10, and perform the SL communication according to configuration of the base station 10. However, a terminal 22 located outside the network coverage range cannot receive the configuration signaling from the base station 10, and in this case, the terminal 22 located outside the network coverage range will determine SL configuration according to pre-configuration information and information carried in a Physical Sidelink Broadcast Channel (PSBCH) transmitted by the terminal 21 within the network coverage range, and performs the SL communication.

FIG. 3: in case of the SL communication outside the network coverage, all terminals 22 performing the SL communication are located outside the network coverage range, and all terminals 22 determine SL configuration according to pre-configured information, and perform the SL communication.

Two transmission modes are defined in 3GPP, i.e., a first mode and a second mode.

First mode: transmission resources of the terminal are allocated by the base station, and the terminal transmits data on the SL according to the resources allocated by the base station; and the base station may allocate resources for a single transmission to the terminal, or may allocate resources for a semi-persistent transmission to the terminal. As illustrated in FIG. 1, the terminal is located within the network coverage range, and the network allocates transmission resources for the SL transmission to the terminal.

Second mode: the terminal selects a resource from the resource pool, to preform data transmission. As illustrated in FIG. 3, the terminal is located outside a cell coverage range, and the terminal autonomously selects transmission resources from a pre-configured resource pool, to perform the SL transmission; or, as illustrated in FIG. 1, the terminal autonomously selects transmission resources from a resource pool configured by a network, to perform the SL transmission.

In New Radio (NR)-V2X (NR-V2X), automatic driving needs to be supported, so that higher requirements are put forward for data interaction between vehicles, such as higher throughput, lower time delay, higher reliability, greater coverage range, more flexible resource allocation, or the like.

Figure 4:
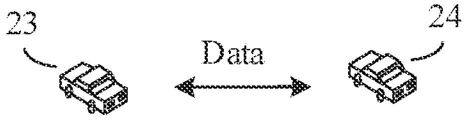
FIG. 4 is a schematic diagram of a sidelink transmission in a related art of the disclosure.
Figure 5:
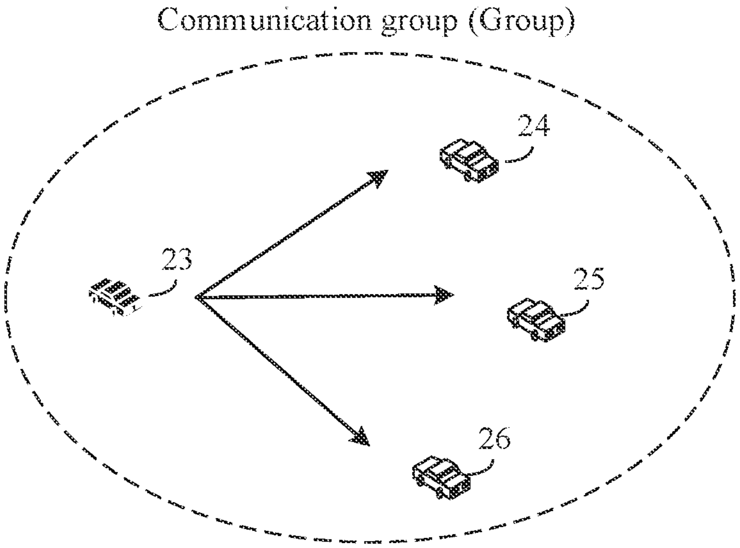
FIG. 5 is a schematic diagram of a sidelink transmission in a related art of the disclosure.
Figure 6:
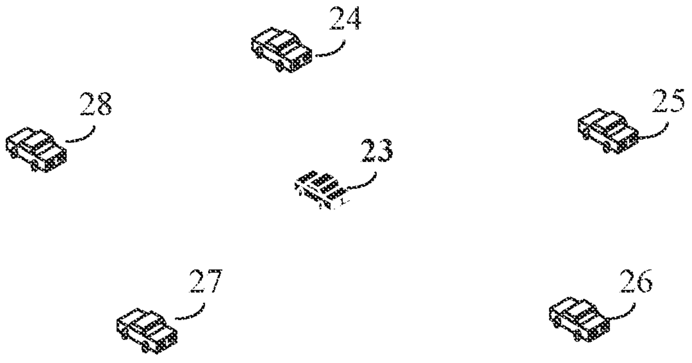
FIG. 6 is a schematic diagram of a sidelink transmission in a related art of the disclosure.

In Long Term Evaluation (LTE)-V2X (LTE-V2X), a broadcast transmission mode is supported, and in the NR-V2X, unicast and multicast transmission modes are introduced. In case of unicast transmission, there is only one terminal at a data receiving terminal thereof, and as illustrated in FIG. 4, unicast transmission is performed between a terminal 23 and a terminal 24; in case of multicast transmission, a receiving terminal thereof includes all terminals in a communication group or all terminals within a certain transmission distance, and as illustrated in FIG. 5, the terminal 23, the terminal 24, a terminal 25 and a terminal 26 form a communication group, here, the terminal 23 is a data transmitting terminal and transmits data, other terminal devices in this group are all data receiving terminals; in case of the broadcast transmission mode, a data receiving terminal is any terminal around a data transmitting terminal, and as illustrated in FIG. 6, the terminal 23 is a data transmitting terminal, while other terminals around the terminal 23, i.e., the terminal 24, the terminal 25, the terminal 26, a terminal 27 and a terminal 28 are all data receiving terminals.

A system frame structure of the NR-V2X is described as follows.

Figure 7:
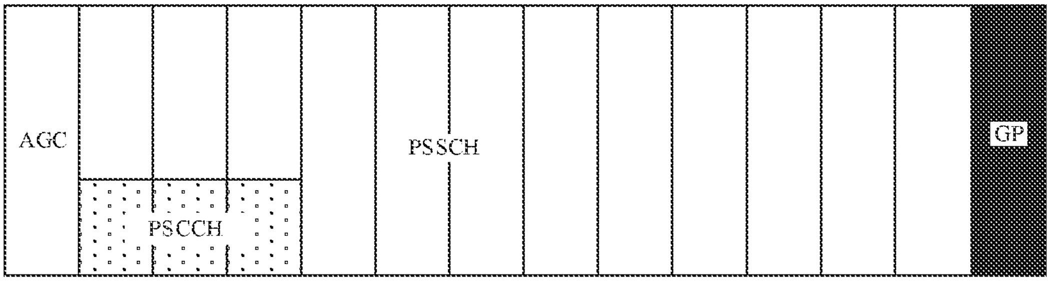
FIG. 7 is a schematic diagram of a slot structure according to an exemplary embodiment of the disclosure.
Figure 8:
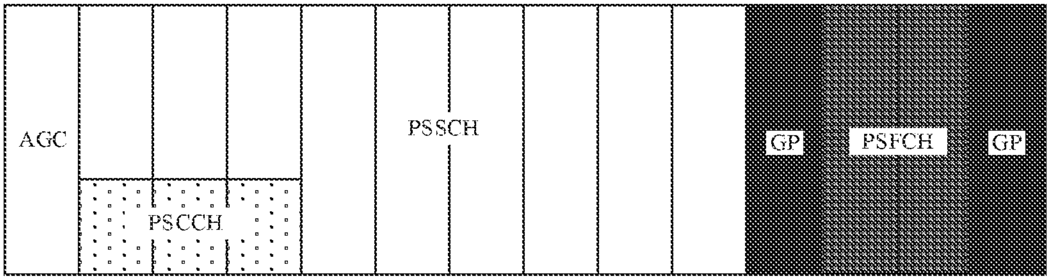
FIG. 8 is a schematic diagram of a slot structure according to an exemplary embodiment of the disclosure.

Slot structures in the NR-V2X are illustrated in FIG. 7 and FIG. 8.

FIG. 7 represents a slot structure where a slot does not include a Physical Sidelink Feedback Channel (PSFCH) channel, FIG. 8 represents a slot structure where a PSFCH channel is included.

In the NR-V2X, a Physical Sidelink Control Channel (PSCCH) starts from a second SL symbol of the slot in a time domain, occupies 2 or 3 Orthogonal Frequency Division Multiplexing (OFDM) symbols, and may occupy {10, 12, 15, 20, 25} Physical Resource Blocks (PRBs) in a frequency domain. In order to facilitate blind detection of the PSCCH by a UE, only one PSCCH symbol number and the number of PRBs are allowed to be configured in a resource pool. Furthermore, since a sub-channel is a minimum granularity allocated to a Physical Sidelink Shared Channel (PSSCH) resource in the NR-V2X, the number of PRBs occupied by the PSCCH must be less than or equal to the number of PRBs included in a sub-channel in the resource pool, to avoid additional restrictions on selection or allocation of the PSSCH resource. The PSSCH also starts from the second SL symbol of the slot in the time domain, a last time-domain symbol in the slot is a Guard Period (GP) symbol, and the remaining symbols map the PSSCH. A first SL symbol in the slot is a repetition of the second SL symbol, and the data receiving terminal usually uses the first SL symbol as an Automatic Gain Control (AGC) symbol, and data on this symbol is not used for data demodulation generally. The PSSCH occupies K sub-channels in the frequency domain, and each of the sub-channels includes N consecutive PRBs, as illustrated in FIG. 7.

When the PSFCH channel is included in the slot, second-to-last and third-to-last symbols in the slot are used for transmission of the PSFCH channel, and a time-domain symbol before the PSFCH channel is used as the GP symbol, as illustrated in FIG. 8.

Figure 9:
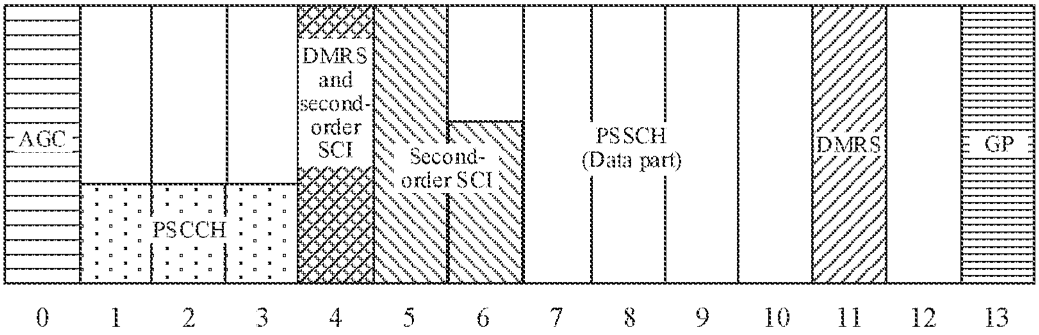
FIG. 9 is a schematic diagram of a slot structure according to an exemplary embodiment of the disclosure.

As illustrated in FIG. 9, 2-order Sidelink Control Information (SCI) is introduced into the NR-V2X. A first-order SCI is carried in the PSCCH, to indicate the PSSCH transmission resources, reserved resource information, a Modulation and Coding Scheme (MCS) level, priority, and other information. A second-order SCI is transmitted in the PSSCH resources, and is demodulated by using a Demodulation Reference Symbol (DMRS) of the PSSCH, to indicate Identity (ID) of the data transmitting terminal, ID of the data receiving terminal, a Hybrid Automatic Repeat reQuest (HARQ) ID, a New Data Indicator (NDI), and other Information for data demodulation. The second-order SCI starts mapping from a first DMRS symbol of the PSSCH, and performs frequency-domain mapping and then time-domain mapping, and as illustrated in FIG. 9, the PSCCH occupies 3 symbols (symbols 1, 2, 3), the DMRS of the PSSCH occupies symbols 4 and 11, the second-order SCI is mapped from the symbol 4 and is frequency division multiplexed with the DMRS on the symbol 4, the second-order SCI is mapped to symbols 4, 5 and 6, and sizes of resources occupied by the second-order SCI depends on the number of bits of the second-order SCI.

Figure 10:
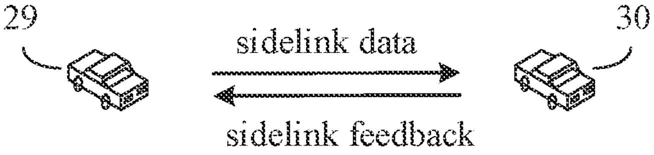
FIG. 10 is a schematic diagram of a sidelink transmission in a related art of the disclosure.

As illustrated in FIG. 10, in order to improve reliability, a SL feedback channel is introduced into the NR-V2X. For example, in case of unicast transmission, a first terminal (data transmitting terminal) 29 transmits SL data (including a PSCCH and a PSSCH) to a second terminal (data receiving terminal) 30, the second terminal 30 transmits a HARQ feedback information (including an Acknowledgement (ACK) or a Negative Acknowledgement (NACK)) to the first terminal 29, and the first terminal determines, according to the feedback information of the second terminal, whether retransmission needs to be performed. The HARQ feedback information is carried in the SL feedback channel, such as PSFCH.

A SL feedback may be activated or deactivated by pre-configured information or network-configured information, and when the SL feedback is activated, the data receiving terminal receives the SL data transmitted by the data transmitting terminal, and feeds the HARQ ACK or NACK back to the transmitting terminal according to a detection result, and the data transmitting terminal determines transmission of retransmission data or new data according to the feedback information of the receiving terminal; when the SL feedback is deactivated, the data receiving terminal does not need to transmit the feedback information, and the data transmitting terminal usually transmits data in a blind retransmission mode, for example, the data transmitting terminal repeatedly transmits each SL data K times, rather than determining whether the retransmission data needs to be transmitted according to the feedback information of the data receiving terminal.

Figure 11:
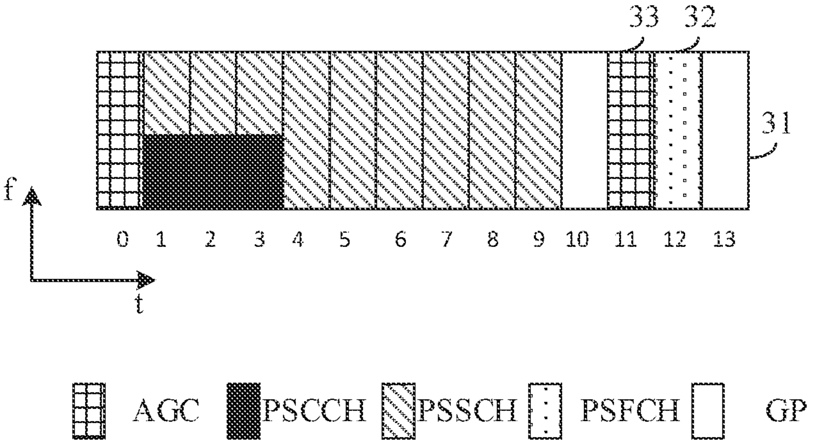
FIG. 11 is a schematic diagram of a slot structure according to an exemplary embodiment of the disclosure.

A PSFCH is introduced into the NR-V2X, carries 1-bit HARQ-ACK information, occupies two time-domain symbols in the time domain (the second symbol carries a SL feedback information, data on the first symbol is a copy of data on the second symbol, however, the first symbol is usually used as AGC at the data receiving terminal), and occupies a PRB in the frequency domain. In a slot, structures of the PSFCH and PSSCH/PSCCH are illustrated in FIG. 11, and FIG. 11 schematically shows positions of time-domain symbols occupied by the PSFCH, the PSCCH and the PSSCH in a slot. In a slot, a last symbol (symbol 13) is used as a GP, a second-to-last symbol (symbol 12) is used for the PSFCH transmission, data on a third-to-last symbol (symbol 11) is the same as data on the second-to-last symbol and the third-to-last symbol is used as AGC, a fourth-to-last symbol (symbol 10) is also used as the GP, a first symbol in the slot is used as AGC and data on the first symbol is the same as data on a second time-domain symbol in the slot, the PSCCH occupies three time-domain symbols, and the remaining symbols may be used for the PSSCH transmission.

Figure 12:
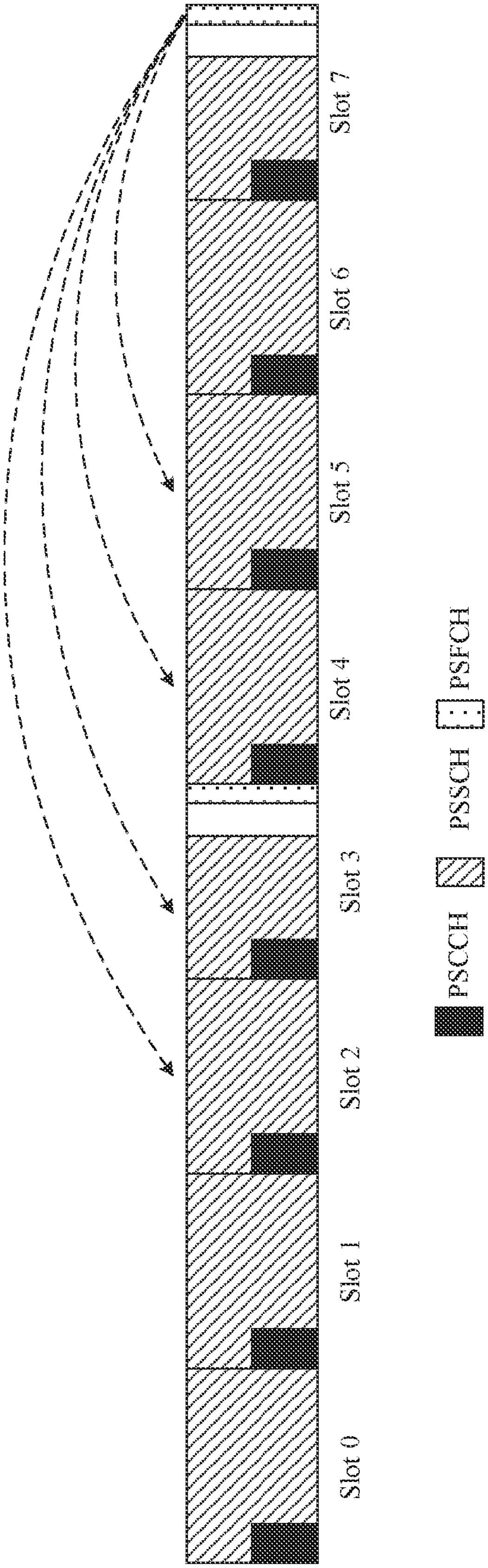
FIG. 12 is a schematic diagram of a slot structure according to an exemplary embodiment of the disclosure

In order to reduce overhead of the PSFCH channel, a slot in every N slots is defined to include PSFCH transmission resources, that is, SL feedback resource has a period of N slots, here N=1, 2, 4, the parameter N is a pre-configured or network-configured, and when N=4, as illustrated in FIG. 12, feedback information of PSSCHs transmitted in slots 2, 3, 4, 5 are all transmitted in slot 7, therefore, slots {2, 3, 4, 5} may be regarded as a slot set, PSFCHs corresponding to the PSSCHs transmitted in the slot set are in the same slot.

Figure 13:
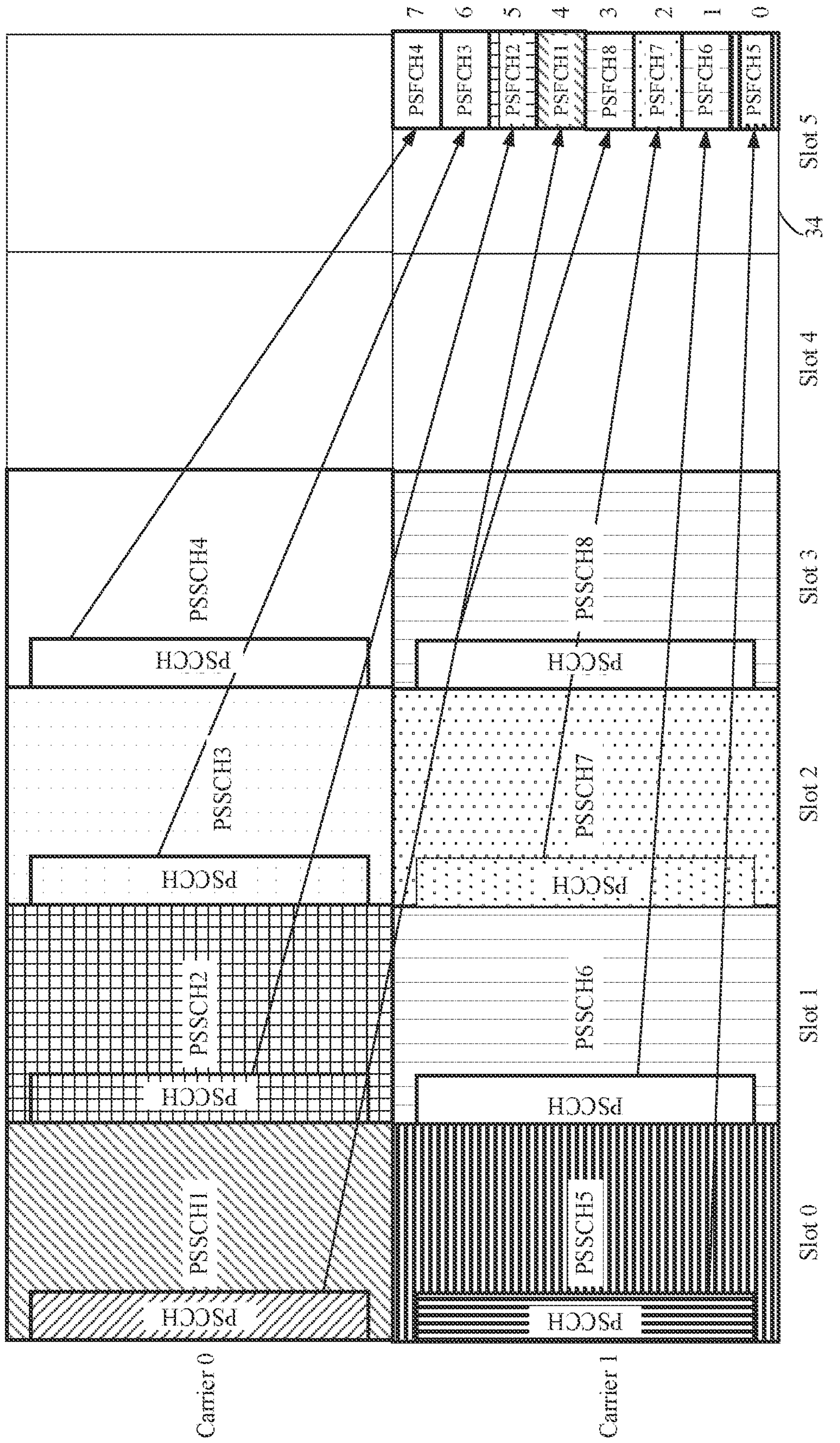
FIG. 13 is a schematic diagram of correspondences between Physical Sidelink Feedback Channel (PSFCH) transmission resources and Physical Sidelink Shared Channel (PSSCH) resources according to an exemplary embodiment of the disclosure.

Resources of the SL feedback channel may be determined according to the slot where the PSSCH of SL data is located and a starting position of an occupied sub-band, and as illustrated in FIG. 13, here N=4, PSSCHs transmitted at the same sub-band starting position of different slots corresponds to feedback different PSFCH resources in slot 5 respectively. For example, PSSCH1 corresponds to PSFCH1, here, a frequency-domain position of the PSSCH1 is carrier 0, a time-domain position of the PSSCH1 is slot 0, a frequency-domain position of the PSFCH1 is a frequency-domain position 4 in carrier 1, a time-domain position of the PSFCH1 is slot 5; PSSCH2 corresponds to PSFCH2, here, a frequency-domain position of the PSSCH2 is carrier 0, a time-domain position of the PSSCH2 is slot 1, a frequency-domain position of the PSFCH2 is a frequency-domain position 5 in carrier 1, a time-domain position of the PSFCH2 is slot 5; PSSCH3 corresponds to PSFCH3, here, a frequency-domain position of the PSSCH3 is carrier 0, a time-domain position of the PSSCH3 is slot 2, a frequency-domain position of the PSFCH3 is a frequency-domain position 6 in carrier 1, a time-domain position of the PSFCH3 is slot 5; PSSCH4 corresponds to PSFCH4, here, a frequency-domain position of the PSSCH4 is carrier 0, a time-domain position of the PSSCH4 is slot 3, a frequency-domain position of the PSFCH4 is a frequency-domain position 7 in carrier 1, a time-domain position of the PSFCH4 is slot 5; PSSCH5 corresponds to PSFCH5, here, a frequency-domain position of the PSSCH5 is carrier 1, a time-domain position of the PSSCH5 is slot 0, a frequency-domain position of the PSFCH5 is a frequency-domain position 0 in carrier 1, a time-domain position of the PSFCH5 is slot 5; PSSCH6 corresponds to PSFCH6, here, a frequency-domain position of the PSSCH6 is carrier 1, a time-domain position of the PSSCH6 is slot 1, a frequency-domain position of the PSFCH6 is a frequency-domain position 1 in carrier 1, a time-domain position of the PSFCH6 is slot 5; PSSCH7 corresponds to PSFCH7, here, a frequency-domain position of the PSSCH7 is carrier 1, a time-domain position of the PSSCH7 is slot 2, a frequency-domain position of the PSFCH7 is a frequency-domain position 2 in carrier 1, a time-domain position of the PSFCH7 is slot 5; PSSCH8 corresponds to PSFCH8, here, a frequency-domain position of the PSSCH8 is carrier 1, a time-domain position of the PSSCH8 is slot 3, a frequency-domain position of the PSFCH8 is a frequency-domain position 3 in carrier 1, a time-domain position of the PSFCH8 is slot 5.

Figure 14:
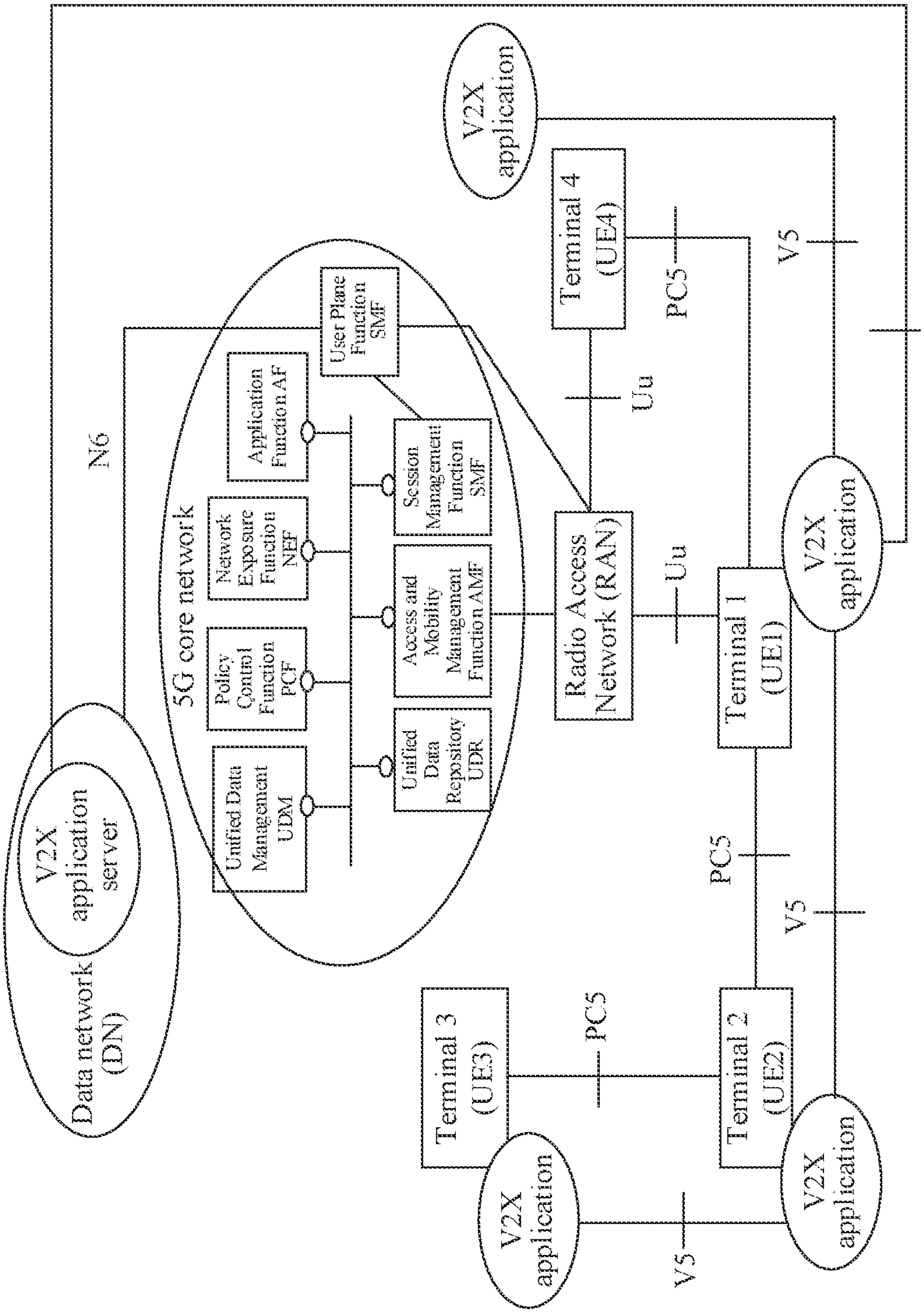
FIG. 14 is a schematic diagram of a communication system according to an exemplary embodiment of the disclosure.

FIG. 14 shows a block diagram of a communication system supporting sidelink transmission according to an exemplary embodiment of the disclosure. The communication system may be a schematic diagram of a non-roaming 5th Generation (5G) system architecture which may be applied to a V2X service using a Device to Device (D2D) technology.

The system architecture includes a Data Network (DN), and the DN is provided with a V2X application server required by the V2X service. The system architecture further includes a 5G core network, and network functions of the 5G core network include Unified Data Management (UDM), a Policy Control Function (PCF), a Network Exposure Function (NEF), an Application Function (AF), Unified Data Repository (UDR), an Access and Mobility Management Function (AMF), a Session Management Function (SMF), and a User Plane Function (UPF).

The system architecture further includes a New Generation-Radio Access Network (NG-RAN), and four terminals (i.e., terminal 1 to terminal 4) as illustrated exemplarily. Optionally, each of the terminals is provided with a V2X application or an application supporting SL transmission. The NG-RAN is provided with one or more access network devices, such as a base station (gNB).

In the system architecture, the data network is connected to the UPF function in the 5G core network through a N6 reference point, and the V2X application server is connected to the V2X application in the terminal through a V1 reference point; the NG-RAN is connected to the AMF function and the UPF function in the 5G core network, and is connected to terminal 1 and terminal 5 through Uu reference points respectively; and SL transmission among multiple terminals is performed through PC5 reference points, and multiple V2X applications are connected through V5 reference points. The above reference points may also be referred to as "interfaces".

It should be understood that "indication" mentioned in the embodiments of the disclosure may be a direct indication, or may be an indirect indication, or may be a representation of an association relationship. For example, A indicates B, which may represent that A indicates B directly, for example, B may be obtained by A; or may represent that A indicates B indirectly, for example, A indicates C, and B may be obtained by C; or may represent that there is an association relationship between A and B.

In the descriptions of the embodiments of the disclosure, a term "correspond" may represent that there are direct correspondences or indirect correspondences between two items, or may represent that there is an association relationship between the two items, or may be a relationship between indication and being indicated, a relationship between configuration and being configured, or the like.

In the embodiments of the disclosure, "predefined" may be implemented by pre-storing corresponding codes, tables, or other manners available for indicating related information in a device (for example, including a terminal device and a network device), and specific implementations thereof are not limited in the disclosure. For example, "predefined" may be defined in a protocol.

Figure 15:
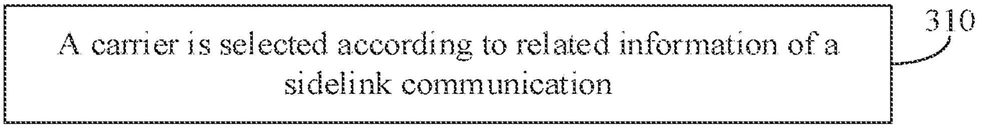
FIG. 15 is a flowchart of a carrier selection method according to an exemplary embodiment of the disclosure.

FIG. 15 shows a flowchart of a carrier selection method according to an exemplary embodiment of the disclosure. The embodiment is exemplified by the method being executed by a first terminal. The method includes the following operation 310.

At operation 310, a carrier is selected according to related information of a SL communication.

The first terminal selects at least one carrier from multiple candidate carriers according to the related information of the SL communication. Optionally, in a SL multi-carrier scenario, the first terminal selects at least one carrier from multiple candidate carriers according to the related information of the SL communication.

The related information of the SL communication is information related to at least one element of a channel, a service, a Quality of Service (QoS) attribute and a UE capability of the SL communication.

Exemplarily, the related information of the SL communication includes at least one of:

configuration information of PSFCH corresponding to each of candidate carriers, a QoS attribute of to-be-transmitted SL data, configuration information of a BandWidth Part (BWP) associated with each of the candidate carriers, a carrier set selected by a second terminal, a service type of to-be-transmitted data, a service attribute of to-be-transmitted data, a UE capability, a Channel Busy Ratio (CBR) condition, or indication information of a third terminal.

Here, the first terminal is a SL transmitting terminal (data transmitting terminal), the second terminal is a SL receiving terminal (data receiving terminal), and the third terminal is a terminal other than the first terminal. Exemplarily, the SL transmitting terminal is a SL data transmitting terminal (also referred to as a "data transmitting terminal"), and the SL receiving terminal is a SL data receiving terminal (also referred to as a "data receiving terminal").

That is, the third terminal may be a SL data receiving terminal (the second terminal), or may be another terminal which is different from the first terminal and the second terminal in a communication group where the first terminal is located.

When the first terminal transmits a PSSCH, the SL data is data carried in the PSSCH, and when the first terminal transmits a PSFCH, the SL data is data carried in the PSFCH, i.e., SL feedback information. When the second terminal receives the PSSCH, the SL data is the data carried in the PSSCH, and when the second terminal receives the PSFCH, the SL data is the data carried in the PSFCH, i.e., the SL feedback information.

In summary, according to the method provided in the embodiment, the terminal correspondingly selects a carrier according to the related information of the SL communication, so that the carrier may be reasonably selected in a SL multi-carrier transmission scenario, to enable the selected carrier to be matched with requirements of the SL communication, improving quality of the SL communication. In different transmission scenarios, appropriate carriers may be adaptively selected to complete the SL communication, thereby meeting performance requirements of various application scenarios on aspects of the SL communication such as time delay, reliability, transmission rate, or the like.

Exemplarily, the related information of the SL communication includes at least one of the following types of information.

1) The configuration information of the PSFCH corresponding to each of the candidate carriers includes at least one of:

whether the candidate carrier is configured with a SL feedback resource, a period of the SL feedback resource, the number of SL feedback resources, or a PSFCH format supported by the candidate carrier.

2) The QoS attribute of the to-be-transmitted SL data includes at least one of:

a reliability requirement, a time delay, a priority, or a transmission rate requirement of the to-be-transmitted SL data.

3) The configuration information of the BWP associated with each of the candidate carriers includes at least one of:

a numerology or a carrier bandwidth.

Here, the numerology includes a Subcarrier Spacing (SCS) and a Cyclic Prefix (CP) type.

4) The carrier set selected by the second terminal.

Optionally, the second terminal is a SL data receiving terminal (a data receiving terminal), and the second terminal is a communication peer side of the first terminal during the SL communication.

5) The service type of the to-be-transmitted data. For example, a carrier corresponding to the service type is selected according to the service type.

6) The service attribute of the to-be-transmitted data, such as a period of the to-be-transmitted data.

7) The UE capability: at least one of capability information of the second terminal (for example, the number of carriers supporting simultaneous reception of SL data, the number of carriers supporting simultaneous transmission of SL data), or capability information of the first terminal (for example, the number of carriers supporting simultaneous transmission of SL data, the number of carriers supporting simultaneous reception of SL data).

8) The indication information of the third terminal.

Exemplarily, multiple carrier selection modes may be obtained according to any combination of the above types of related information of the SL communication. A part of the selection modes are exemplified below.

For the condition that the related information of the SL communication includes the configuration information of the PSFCH corresponding to each of the candidate carriers, please refer to the following embodiments.

Optionally, a resource pool used by SL transmission is configured by a base station or in a pre-configured manner. Configuration information of the resource pool includes configuration parameter used to configure PSFCH transmission resource, for example, the configuration parameter of the PSFCH transmission resource include the following parameters:

sl-PSFCH-Period: used to indicate a period of PSFCH in a present resource pool, and represented by the number of slots; and indicating a period of the PSFCH resource by taking the slot in the resource pool as a unit. If it is set to 0, it indicates that the resource pool does not have PSFCH resource, that is, the resource pool does not support SL feedback, or HARQ feedback is disabled.

sl-PSFCH-RB-Set: used to indicate a Resource Block (RB) set for the PSFCH transmission in the current resource pool;

sl-NumMuxCS-Pair: used to indicate the number of Cyclic Shift (CS) pairs supported in a RB; multiple PSFCHs may be multiplexed in a RB in a manner of Code-Division Multiplexing (CDM), the number of CS pairs represents the number of PSFCHs which may be multiplexed in the manner of CDM, and a CS pair includes two CS values for representing ACK and NACK, as illustrated in Table 1.

TABLE 1 correspondences between the number of CS pairs and values of the CS pairs

| Number of CS pairs | Values of the CS pairs | | | | | |
|---|---|---|---|---|---|---|
| 1 | {0, 6} | / | / | / | / | / |
| 2 | {0, 6} | {3, 9} | / | / | / | / |
| 3 | {0, 6} | {2, 8} | {4, 10} | / | / | / |
| 6 | {0, 6} | {1, 7} | {2, 8} | {3, 9} | {4, 10} | {5, 11} |

sl-MinTimeGapPSFCH: used to indicate a minimum time interval between PSFCH and PSSCH associated with the PSFCH, and represented by the number of slots.

Figure 16:
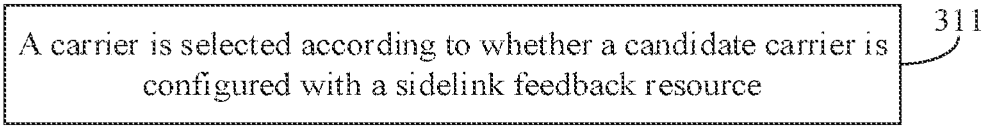
FIG. 16 is a flowchart of a carrier selection method according to an exemplary embodiment of the disclosure.

First Mode:

FIG. 16 shows a flowchart of a carrier selection method according to an exemplary embodiment of the disclosure. The embodiment is exemplified by the method being executed by a first terminal. The method includes the following operation 311.

At operation 311, the first terminal selects a carrier according to whether a candidate carrier is configured with a SL feedback resource.

Exemplarily, the configuration information of the PSFCH corresponding to each of candidate carriers includes: whether the candidate carrier is configured with the SL feedback resource.

Exemplarily, according to requirements of different application scenarios on SL feedback resources, the first terminal may select the carrier according to whether the candidate carrier is configured with the SL feedback resource. When a SL feedback needs to be performed, the first terminal selects a carrier configured with the SL feedback resource; and when the SL feedback does not need to be performed, the first terminal may select the carrier configured with the SL feedback resource, or may select a carrier not configured with the SL feedback resource.

Exemplarily, the candidate carrier is a carrier resource configured for SL transmission by the network device, or the candidate carrier is a carrier resource for the SL transmission agreed by a communication protocol.

The PSFCH corresponding to the candidate carrier is a PSFCH in this candidate carrier, that is, whether this candidate carrier is configured with a PFSCH resource.

For example, when the SL feedback is required by to-be-transmitted SL data, a first carrier is selected from the candidate carriers, and the first carrier is configured with the SL feedback resource; and when the SL feedback is not required by the to-be-transmitted SL data, a second carrier is selected from the candidate carriers, and the second carrier is not configured with the SL feedback resource, or configured with the SL feedback resource.

Exemplarily, when the SL feedback is required by a logical channel corresponding to the to-be-transmitted SL data, the first carrier is selected from the candidate carriers, and the first carrier is configured with the SL feedback resource; and when the SL feedback is not required by the logical channel corresponding to the to-be-transmitted SL data, the second carrier is selected from the candidate carriers, and the second carrier is not configured with the SL feedback resource, or configured with the SL feedback resource.

In a NR SL system, SL data in different logical channels have different attributes, for example, the SL feedback is required by SL data in a first logical channel; the SL feedback is not required by SL data in a second logical channel; or there are correspondences between the logical channels and whether the SL feedback needs to be performed, and the first terminal performs carrier selection according to a logical channel to which a current to-be-transmitted SL data belongs and the correspondences between the logical channels and whether the SL feedback needs to be performed.

For example, the system is configured with four carriers, i.e., a carrier 0, a carrier 1, a carrier 2 and a carrier 3. Here, no SL feedback resource is configured on the carrier 0, SL feedback resources are configured on the carrier 1, the carrier 2 and the carrier 3 respectively. When the first terminal performs carrier selection, the first terminal performs carrier selection according to whether a selected logical channel supports the SL feedback: when the logical channel supports the SL feedback, the first terminal may select one or more of the carrier 1, the carrier 2 and the carrier 3; and when the logical channel does not support the SL feedback, the first terminal may select one or more of the carrier 0, the carrier 1, the carrier 2 and the carrier 3. Although the carrier 1, the carrier 2 and the carrier 3 support the SL feedback (that is, these carriers are configured with SL feedback resources), when the first terminal uses these carriers to perform the SL transmission, it may indicate by indication information of SCI that the first terminal does not perform the SL feedback, i.e., disables the SL feedback.

In summary, according to the method provided in the embodiment, a carrier is reasonably selected in a SL multi-carrier transmission scenario according to whether the candidate carrier is configured with the SL feedback resource. When the SL feedback is required by the logical channel corresponding to the to-be-transmitted SL data, a carrier configured with the SL feedback resource is selected, and when the SL feedback is not required by the logical channel corresponding to the to-be-transmitted SL data, a carrier configured with the SL feedback resource or a carrier not configured with the SL feedback resource is selected. According to requirements of different SL data on the SL feedback, appropriate carriers may be adaptively selected to complete SL communication, thereby meeting requirements of the SL data on aspects of the SL feedback, and improving quality of the SL transmission.

Figure 17:
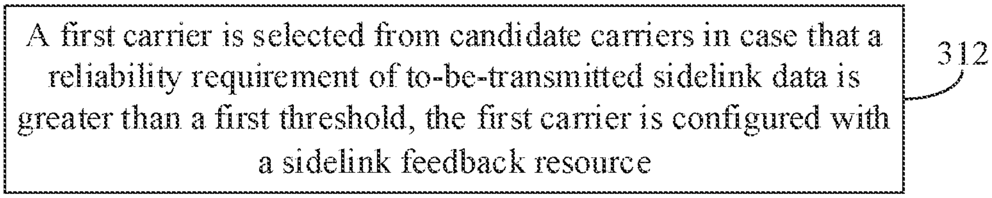
FIG. 17 is a flowchart of a carrier selection method according to an exemplary embodiment of the disclosure.

Second Mode:

FIG. 17 shows a flowchart of a carrier selection method according to an exemplary embodiment of the disclosure. The embodiment is exemplified by the method being executed by a first terminal. The method includes the following operation 312.

At operation 312, the first terminal selects a carrier from candidate carriers in case that a reliability requirement of to-be-transmitted SL data is greater than a first threshold, the first carrier is configured with a SL feedback resource.

The first terminal selects a twelfth carrier from the candidate carriers in case that the reliability requirement of the to-be-transmitted SL data is less than the first threshold, the twelfth carrier is configured with the SL feedback resource, or not configured with the SL feedback resource.

The configuration information of the PSFCH corresponding to the candidate carrier includes: whether the candidate carrier is configured with the SL feedback resource, and QoS attribute of the to-be-transmitted SL data includes the reliability requirement of the to-be-transmitted SL data.

In case that the SL data supports SL feedback, the first terminal transmits the SL data, and in response to SL feedback transmitted by the second terminal, the first terminal determines whether retransmission is performed according to state information of the SL feedback. Before the first terminal receives the feedback information from the second terminal, the first terminal cannot perform SL retransmission. Therefore, the first terminal may perform carrier selection according to the QoS attribute of the SL data.

For example, in case that the SL data of the terminal has a high reliability requirement, the first terminal may select a carrier supporting the SL feedback to perform SL transmission.

In summary, according to the method provided in the embodiment, a carrier is reasonably selected in a SL multi-carrier transmission scenario according to the reliability requirement of the to-be-transmitted SL data. When the reliability requirement of the to-be-transmitted SL data is greater than or equal to the first threshold, a carrier configured with the SL feedback resource is selected, and when the reliability requirement of the to-be-transmitted SL data is less than the first threshold, the carrier configured with the SL feedback resource or a carrier not configured with the SL feedback resource is selected. According to reliability requirements of different SL data on the SL transmission, appropriate carriers may be adaptively selected to complete SL communication, thereby meeting requirements of the SL data on the reliability, and improving quality of the SL transmission.

Figure 18:
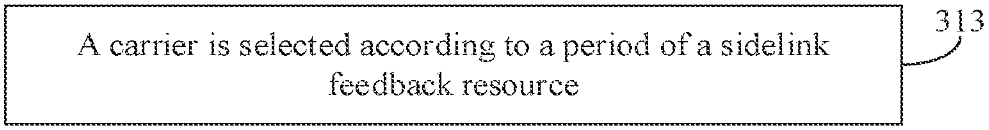
FIG. 18 is a flowchart of a carrier selection method according to an exemplary embodiment of the disclosure.

Third Mode:

FIG. 18 shows a flowchart of a carrier selection method according to an exemplary embodiment of the disclosure. The embodiment is exemplified by the method being executed by a first terminal. The method includes the following operation 313.

At operation 313, the first terminal selects a carrier according to a period of a SL feedback resource.

The configuration information of the PSFCH corresponding to each of candidate carriers includes the period of the SL feedback resource.

Exemplarily, when a time delay of to-be-transmitted SL data is less than a second threshold, the first terminal selects a third carrier from the candidate carriers, and a period of a SL feedback resource of the third carrier is less than a third threshold.

When the SL data of the first terminal has a low time delay requirement, the first terminal may select a carrier with a short PSFCH period to perform SL transmission.

Figure 19:
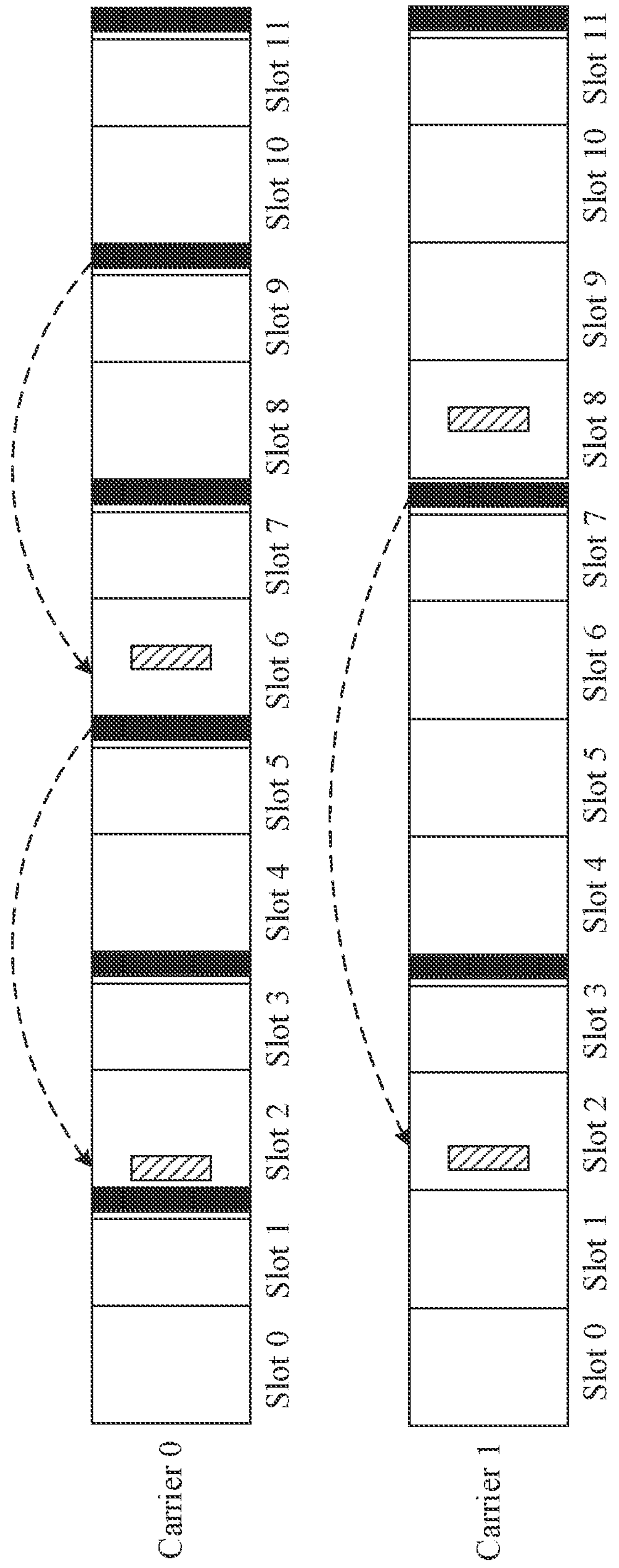
FIG. 19 is a schematic diagram of a slot structure according to an exemplary embodiment of the disclosure.

For example, as illustrated in FIG. 19, a minimum time interval between PSFCH and PSSCH is 2 slots, and the system supports two carriers, i.e., a carrier 0 and a carrier 1. Here, PSFCH on the carrier 0 has a period of 2 slots, PSFCH on the carrier 1 has a period of 4 slots. When the first terminal uses the carrier 0 to perform the SL transmission and performs the SL transmission in slot 2, then PSFCH corresponding thereto is located in slot 5; and when the first terminal receives NACK and performs retransmission in slot 6, then PSFCH corresponding to the retransmission is located in slot 9. When the first terminal uses the carrier 1 to perform the SL transmission and performs the SL transmission in slot 2, then PSFCH corresponding thereto is located in slot 7, and when the first terminal receives NACK and performs retransmission in slot 8, then PSFCH corresponding to the retransmission is located in slot 11. Comparing the carrier 0 with the carrier 1, the slot where the first terminal performs retransmission on the carrier 1 is later than the slot where the first terminal performs retransmission on the carrier 0 by two slots, and the PSFCH corresponding to the retransmission on the carrier 1 is also later than the PSFCH corresponding to the retransmission on the carrier 0 by two slots. Therefore, when the SL data of the first terminal has a low time delay requirement, the first terminal should select the carrier 0 to perform the SL transmission.

In summary, according to the method provided in the embodiment, a carrier is reasonably selected for the time delay of the SL data in a SL multi-carrier transmission scenario according to the period of the SL feedback resource. When the SL data has a low time delay requirement, a carrier with a short PSFCH period is selected to perform the SL transmission. According to requirements of different SL data on the time delay, carrier with appropriate PSFCH period may be adaptively selected to complete SL communication, thereby meeting requirements of the SL data on the time delay, and improving quality of the SL transmission.

Figure 20:
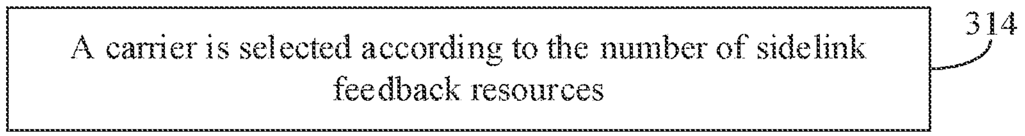
FIG. 20 is a flowchart of a carrier selection method according to an exemplary embodiment of the disclosure.

Fourth Mode:

FIG. 20 shows a flowchart of a carrier selection method according to an exemplary embodiment of the disclosure. The embodiment is exemplified by the method being executed by a first terminal. The method includes the following operation 314.

At operation 314, the first terminal selects a carrier according to the number of SL feedback resources.

The configuration information of the PSFCH corresponding to candidate carriers includes the number of SL feedback resources.

Exemplarily, the number of SL feedback resources includes the number of SL feedback resources in a slot used for SL feedback, or a total number of SL feedback resources in a resource pool. Here, the number of feedback resources includes the number of frequency-domain resources for the SL feedback, or sum of the number of frequency-domain resources and the number of code-domain resources for the SL feedback.

Exemplarily, the first terminal selects a fourth carrier from the candidate carriers, the number of SL feedback resources of the fourth carrier is greater than a fourth threshold.

Exemplarily, the first terminal selects a carrier from the candidate carriers in the order of the number of SL feedback resources from high to low according to the number of SL feedback resources of the candidate carriers.

The selected fourth carrier may be one or more carriers. When the number of carriers where the first terminal supports simultaneous transmission of SL data is one, the fourth carrier may be one carrier, and when the number of carriers where the first terminal supports simultaneous transmission of SL data is more than one, the fourth carrier may be one or more carriers.

Exemplarily, the first terminal may also determine, from the candidate carriers, multiple candidate carriers of which the number of SL feedback resources is greater than the fourth threshold, and then select a final carrier from the multiple candidate carriers according to the number of SL feedback resources of the multiple candidate carriers in a descending order.

In an optional implementation, the configuration information of the PSFCH corresponding to the candidate carrier includes the number of SL feedback resources, and the UE capability includes: the number of carriers where the first terminal supports simultaneous transmission of SL data, and the number of carriers where the first terminal supports simultaneous reception of SL data.

The first terminal selects the carrier according to the number of SL feedback resources in case that the number of carriers where the first terminal supports simultaneous reception of SL data is greater than the number of carriers where the first terminal supports simultaneous transmission of SL data.

In case that the first terminal supports SL multi-carrier transmission, the number of carriers of which simultaneous reception may be supported by the terminal may be different from the number of carriers of which simultaneous transmission may be supported by the terminal according to transmission or reception capability of the terminal. For example, the terminal may support simultaneous reception of SL data of four carriers, but may support simultaneous transmission of SL data on only one carrier. At this time, SL feedback information corresponding to SL data received by the terminal on multiple carriers need to be transmitted on a carrier. Therefore, when the terminal selects a carrier, carrier selection may be performed according to PSFCH transmission resources on each carrier, for example, a carrier with more PSFCH transmission resources is selected as a transmitting carrier, so that simultaneous transmission of more PSFCH channels may be supported. Furthermore, the more the PSFCH transmission resources, the lower the interference between PSFCHs.

Figure 21:
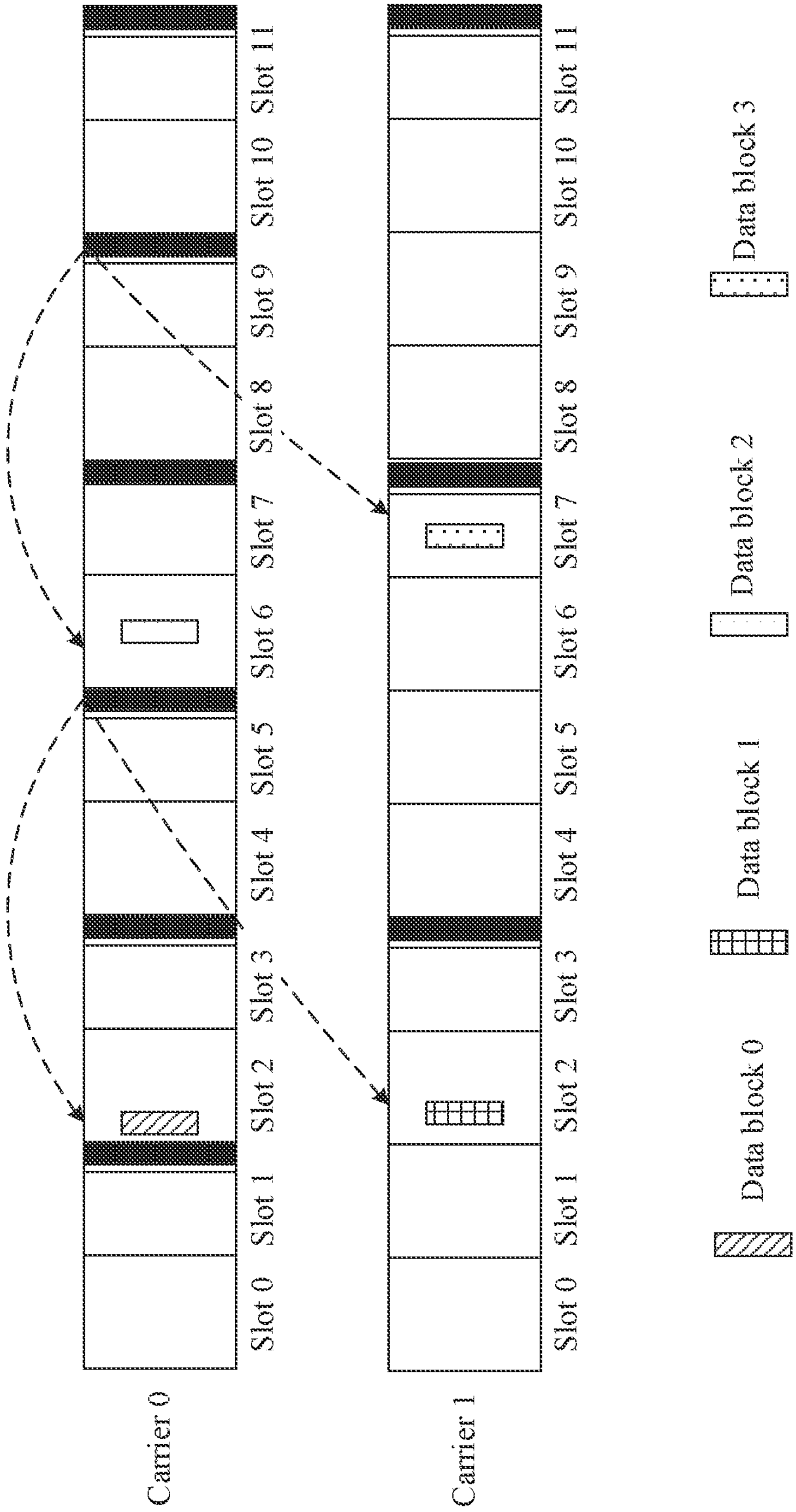
FIG. 21 is a schematic diagram of a slot structure according to an exemplary embodiment of the disclosure.

For example, as illustrated in FIG. 21, the terminal receives SL data on the carrier 0 and the carrier 1, and the SL data correspond to a data block 0, a data block 1, a data block 2 and a data block 3 respectively. These SL data blocks may come from the same terminal or different terminals, and when the terminal receives these SL data, the terminal needs to perform SL feedback for the SL data. Since the terminal may support simultaneous transmission of SL data on only one carrier, the terminal needs to perform carrier selection in the carrier 0 or the carrier 1, and when PSFCH transmission resources configured on the carrier 0 are more than PSFCH transmission resources configured on the carrier 1 (including time-domain resources, frequency-domain resource and/or code-domain resources), the terminal selects the carrier 0 to perform the SL transmission, and transmits, on the carrier 0, the SL feedback information for the SL data on the carrier 0 and the carrier 1.

In FIG. 21, the PSFCH on the carrier 0 has a period of 2 slots, the PSFCH on the carrier 1 has a period of 4 slots. When the number of RBs used for transmission of the PSFCH is the same on each PSFCH slot, the PSFCH resources on the carrier 0 are more than the PSFCH resources on the carrier 1. Or, the PSFCH of the carrier 0 has the same period as that of the PSFCH of the carrier 1, the number of RBs in each PSFCH slot on the carrier 0 is greater than the number of RBs in each PSFCH slot on the carrier 1, which may also be considered that the PSFCH resources on the carrier 0 are more than the PSFCH resources on the carrier 1.

In an optional implementation, the first terminal selects the fourth carrier from the candidate carriers in case that the number of carriers where the first terminal supports simultaneous reception of SL data is greater than the number of carriers where the first terminal supports simultaneous transmission of SL data, and the number of SL feedback resources of the fourth carrier is greater than the fourth threshold.

In summary, according to the method provided in the embodiment, a carrier is reasonably selected in a SL multi-carrier transmission scenario according to the number of SL feedback resources. Carrier selection is performed according to the number of PSFCH transmission resources on the carrier, and a carrier with more PSFCH transmission resources is selected as a transmitting carrier, so that simultaneous transmission of more PSFCH channels may be supported. Furthermore, the more the PSFCH transmission resources, the lower the interference between PSFCHs, thereby improving the PSFCH feedback quality.

Figure 22:
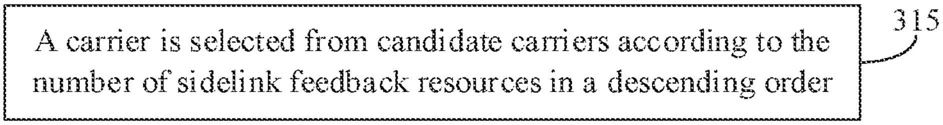
FIG. 22 is a flowchart of a carrier selection method according to an exemplary embodiment of the disclosure.

Fifth Mode:

Based on the fourth mode, the terminal may further sort the candidate carriers in a descending order according to the number of SL feedback resources, and select carriers in sequence, that is, the fifth mode is obtained. FIG. 22 shows a flowchart of a carrier selection method according to an exemplary embodiment of the disclosure. The embodiment is exemplified by the method being executed by a first terminal. The method includes the following operation 315.

At operation 315, a carrier is selected from candidate carriers in a descending order according to the number of SL feedback resources.

The first terminal may sort the candidate carriers in the descending order according to the number of SL feedback resources, and then select carriers ranked at top few positions.

For example, when the number of carriers where the first terminal supports simultaneous transmission of SL data is one, the first terminal may sort the candidate carriers in the descending order according to the number of SL feedback resources, and then select the carrier ranked at the first position. When the number of carriers where the first terminal supports simultaneous transmission of SL data is more than one, the first terminal may sort the candidate carriers in the descending order according to the number of SL feedback resources, and then select carriers ranked at top few positions.

Exemplarily, the first terminal may further sort the candidate carriers in the descending order according to the number of SL feedback resources, and then select multiple candidate carriers (four carriers) ranked at top few positions, and then select a final carrier from the multiple candidate carriers (four carriers) by other carrier selection modes.

In an optional implementation, the configuration information of the PSFCH corresponding to the candidate carrier includes the number of SL feedback resources, and UE capability includes: the number of carriers where the first terminal supports simultaneous transmission of SL data, and the number of carriers where the first terminal supports simultaneous reception of SL data.

The first terminal selects a carrier from the candidate carriers according to the number of SL feedback resources in a descending order in case that the number of carriers where the first terminal supports simultaneous reception of SL data is greater than the number of carriers where the first terminal supports simultaneous transmission of SL data.

In summary, according to the method provided in the embodiment, a transmitting carrier is reasonably selected in a SL multi-carrier transmission scenario according to the number of SL feedback resources. Carrier selection is performed in the descending order according to the number of SL feedback resources, and a carrier with more PSFCH transmission resources is selected as the transmitting carrier, so that simultaneous transmission of more PSFCH channels may be supported. Furthermore, the more the PSFCH transmission resources, the lower the interference between PSFCHs, thereby improving the PSFCH feedback quality.

Figure 23:
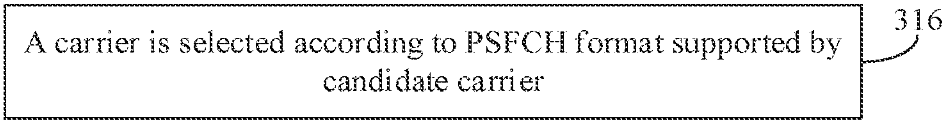
FIG. 23 is a flowchart of a carrier selection method according to an exemplary embodiment of the disclosure.

Sixth Mode:

FIG. 23 shows a flowchart of a carrier selection method according to an exemplary embodiment of the disclosure. The embodiment is exemplified by the method being executed by a first terminal. The method includes the following operation 316.

At operation 316, the first terminal selects a carrier according to PSFCH format supported by candidate carrier.

The configuration information of the PSFCH corresponding to each of the candidate carriers includes PSFCH format supported by the candidate carrier.

Exemplarily, the first terminal selects a fifth carrier from the candidate carriers, a PSFCH format supported on the fifth carrier is a first format which supports carrying SL feedback information with at most 1 bit; or, the first terminal selects a sixth carrier from the candidate carriers, a PSFCH format supported on the sixth carrier is a second format which supports carrying SL feedback information with at most m bits, and m is an integer greater than 1.

In an embodiment, PSFCH in the second format occupies M1 RBs in the frequency domain, or occupies M2 time-domain symbols in the time domain, here, a value of M2 is equal to the number of time-domain symbols used for SL transmission in a slot minus 1, and M1 is an integer greater than 1.

In Release 16 (R16) NR SL, PSFCH channel is only used to feed back HARQ-ACK information, and each PSFCH channel may only carry 1 bit. When SL feedback information of multiple carriers is transmitted on one carrier, and when SL feedback information on each carrier is carried by multiple PSFCH channels respectively, a large number of PSFCH channels are required, and how to determine PSFCH transmission resources corresponding to each carrier is a relatively complex problem. Another mode is that the SL feedback information of multiple carriers is carried by one PSFCH channel, and at this time, the PSFCH channel needs to carry N bits, that is, a new PSFCH channel format needs to be designed to carry SL feedback information more than 1 bit. An existing PSFCH channel format is referred to as format 0, and a new channel format is referred to as format 1.

When carrier selection is performed, the first terminal may perform carrier selection according to the channel format supported on the carrier. For example, the carrier 0 supports the PSFCH format 0, the carrier 1 supports the PSFCH format 0 and the PSFCH format 1, and when the first terminal needs to use the format 1 to perform the SL feedback, the first terminal selects the carrier 1, and when the first terminal needs to use the format 0 to perform the SL feedback, the first terminal may select the carrier 0 or the carrier 1 to perform the SL transmission.

In summary, according to the method provided in the embodiment, a carrier is reasonably selected in a SL multi-carrier transmission scenario according to the PSFCH formats supported by the candidate carriers. Carrier selection is performed according to the PSFCH formats supported by the candidate carriers, and a format required by the SL feedback is selected to select a carrier supporting a corresponding PSFCH format, so as to complete the SL feedback on the carrier.

For the condition that the related information of the SL communication includes the configuration information of the BWP associated with each of the candidate carriers, please refer to the following embodiments.

Figure 24:
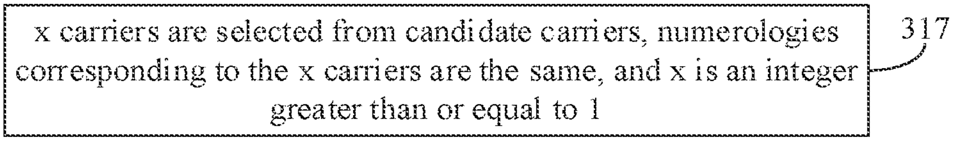
FIG. 24 is a flowchart of a carrier selection method according to an exemplary embodiment of the disclosure.

Seventh Mode:

FIG. 24 shows a flowchart of a carrier selection method according to an exemplary embodiment of the disclosure. The embodiment is exemplified by the method being executed by a first terminal. The method includes the following operation 317.

At operation 317, the first terminal selects x carriers from candidate carriers, numerologies corresponding to the x carriers are the same, and x is an integer greater than or equal to 1.

In an embodiment, the first terminal selects carriers having the same numerology from the candidate carriers.

The configuration information of the BWP associated with the candidate carrier includes a numerology. The numerology includes a SCS and a CP type.

In an example, only one BWP is supported on a carrier, the BWP has a corresponding numerology configuration and a bandwidth configuration, and the numerology includes a SCS, a CP type, or the like.

When the first terminal needs to perform SL transmission on multiple carriers, and configuration of BWP corresponding to each carrier is different, the first terminal needs to perform carrier selection according to the configuration of the BWP of the carrier.

Figure 25:
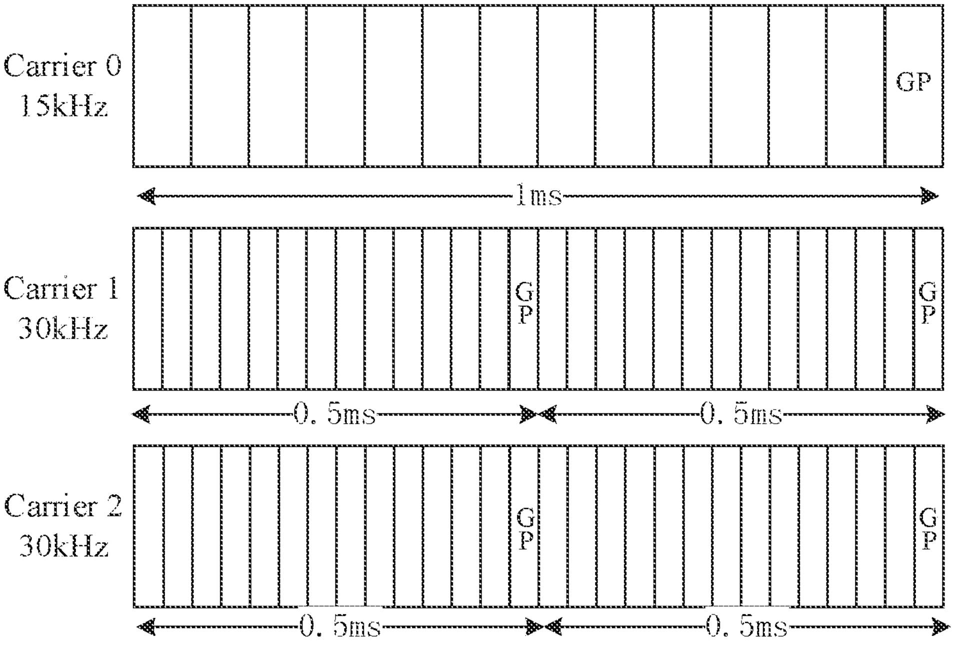
FIG. 25 is a schematic diagram of a slot structure according to an exemplary embodiment of the disclosure.

For example, as illustrated in FIG. 25, the system is configured with three carriers, a SCS of carrier 0 is 15 kHz, a SCS of each of carrier 1 and carrier 2 is 30 kHz. When UE1 selects the carrier 0 and the carrier 1 to perform SL transmission, the first terminal transmits SL data on both carriers simultaneously during the first 0.5 ms, for example, allocates half of transmission power on each of the carriers; however, during the next 0.5 ms, since data transmission on the carrier 1 is completed, and only the SL transmission on the carrier 0 is continued at this time, transmission power is half of the total power, which induces that power received by the second terminal during the first 0.5 ms and the next 0.5 ms is unbalance, and the second terminal needs to perform AGC adjustment again. Therefore, in order to avoid this problem, the first terminal may select the carrier 1 and the carrier 2 to perform the SL transmission, and subcarrier spacing of the two carriers are the same at this time, therefore, the first terminal performs transmission on the two carriers simultaneously, so that the second terminal may be prevented from requirement of performing additional AGC adjustment.

In summary, according to the method provided in the embodiment, a carrier is reasonably selected in a SL multi-carrier transmission scenario according to the numerology of the BWP. Multiple carriers with the same numerology are selected to perform the SL transmission, which may avoid a problem of unbalanced reception power on two carriers, thereby preventing the second terminal from requirement of performing additional AGC adjustment.

Figure 26:
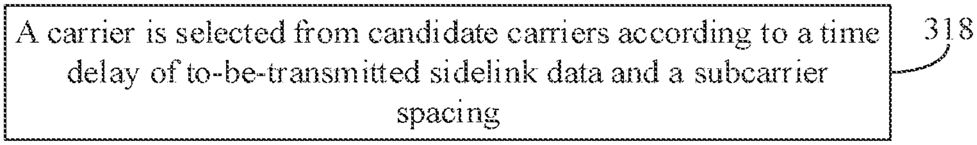
FIG. 26 is a flowchart of a carrier selection method according to an exemplary embodiment of the disclosure.

Eighth Mode:

FIG. 26 shows a flowchart of a carrier selection method according to an exemplary embodiment of the disclosure. The embodiment is exemplified by the method being executed by a first terminal. The method includes the following operation 318.

At operation 318, the first terminal selects a carrier from candidate carriers according to a time delay of to-be-transmitted SL data and a subcarrier spacing.

The configuration information of the BWP associated with the candidate carrier includes the subcarrier spacing.

Exemplarily, the first terminal selects a seventh carrier from the candidate carriers in case that the time delay of the to-be-transmitted SL data is less than a fifth threshold, the seventh carrier has a first subcarrier spacing; and the first terminal selects an eighth carrier from the candidate carriers in case that the time delay of the to-be-transmitted SL data is greater than the fifth threshold, the eighth carrier has a second subcarrier spacing, here, the first subcarrier spacing is greater than the second subcarrier spacing.

The smaller a subcarrier spacing of a numerology corresponding to the carrier, the longer a duration corresponding to each slot. For example, a slot length corresponding to a 15 kHz subcarrier spacing is 1 ms, a slot length corresponding to a 30 kHz subcarrier spacing is 0.5 ms, and a slot length corresponding to a 60 kHz subcarrier spacing is 0.25 ms. Therefore, when the first terminal performs carrier selection, the first terminal may select a corresponding carrier according to a time delay requirement of the to-be-transmitted data (SL data) to perform data transmission. The greater the time delay, a carrier corresponding to a small subcarrier spacing may be selected; the smaller the time delay, a carrier corresponding to a large subcarrier spacing may be selected.

For example, correspondences between a size of the time delay and the subcarrier spacing are configured according to pre-configured information or network-configured information, so that the first terminal selects a carrier corresponding to a time delay of a current to-be-transmitted data according to the time delay and the correspondences.

In summary, according to the method provided in the embodiment, a carrier is reasonably selected for the time delay of the SL data in a SL multi-carrier transmission scenario according to the subcarrier spacing of the BWP. Correspondences between the size of the time delay and the subcarrier spacing are configured according to the pre-configured information or the network-configured information, so that the terminal selects the carrier corresponding to a time delay of a current to-be-transmitted data according to the time delay and the correspondences, improving quality of the SL transmission.

Figure 27:
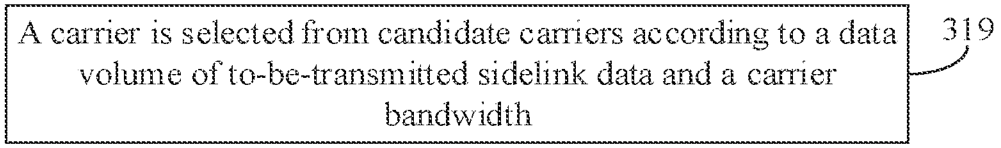
FIG. 27 is a flowchart of a carrier selection method according to an exemplary embodiment of the disclosure.

Ninth Mode:

FIG. 27 shows a flowchart of a carrier selection method according to an exemplary embodiment of the disclosure.

The embodiment is exemplified by the method being executed by a first terminal. The method includes the following operation 319.

At operation 319, the first terminal selects a carrier from candidate carriers according to a data volume of to-be-transmitted SL data and a carrier bandwidth.

The configuration information of the BWP associated with the candidate carrier includes the carrier bandwidth.

Exemplarily, the first terminal selects a ninth carrier from the candidate carriers in case that the data volume of the to-be-transmitted SL data is greater than a sixth threshold, the ninth carrier has a first carrier bandwidth; and the first terminal selects a tenth carrier from the candidate carriers in case that the data volume of the to-be-transmitted SL data is less than the sixth threshold, the tenth carrier has a second carrier bandwidth, here, the first carrier bandwidth is greater than the second carrier bandwidth.

The greater the bandwidth of the carrier, the higher a supported transmission rate. When the terminal has the to-be-transmitted SL data, a carrier may be selected according to a size of the data volume of the to-be-transmitted SL data. When the to-be-transmitted data of the terminal has a large amount, a carrier corresponding to a large bandwidth is selected; otherwise, a carrier corresponding to a small bandwidth may be selected.

When the first terminal selects the carrier with the large bandwidth, the first terminal may select more transmission resources to perform SL transmission, so that the to-be-transmitted data may be transmitted out in a slot. When the carrier with the small bandwidth is selected, all to-be-transmitted data cannot be carried in a slot, so that the to-be-transmitted data needs to be segmented and transmitted in multiple slots respectively, on one hand, a transmission time delay of the data is increased, and on the other hand, transmission in the multiple slots may increase influence of half-duplex. The terminal transmits data in the multiple slots and cannot receive data simultaneously, so that the terminal cannot receive SL data in the multiple slots, thereby increasing the influence of half-duplex.

In summary, according to the method provided in the embodiment, a carrier is reasonably selected in a SL multi-carrier transmission scenario according to the carrier bandwidth. Carrier selection is performed according to the size of the data volume of the to-be-transmitted SL data; and when the to-be-transmitted data of the first terminal has a large amount, the carrier corresponding to the large bandwidth is selected; otherwise, the carrier corresponding to the small bandwidth may be selected, which improves quality of the SL transmission.

For the condition that the related information of the SL communication includes the QoS attribute of the to-be-transmitted SL data, please refer to the following embodiments.

Figure 28:
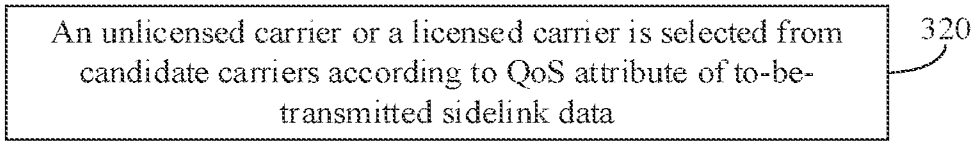
FIG. 28 is a flowchart of a carrier selection method according to an exemplary embodiment of the disclosure.

Tenth Mode:

FIG. 28 shows a flowchart of a carrier selection method according to an exemplary embodiment of the disclosure. The embodiment is exemplified by the method being executed by a first terminal. The method includes the following operation 320.

At operation 320, the first terminal selects an unlicensed carrier or a licensed carrier from candidate carriers according to QoS attribute of to-be-transmitted SL data.

The candidate carriers include the unlicensed carrier and the licensed carrier.

For example, a multi-carrier system configured by the system includes the licensed carrier and the unlicensed carrier. When the first terminal performs SL transmission on the unlicensed carrier, a Listen Before Talk (LBT) operation needs to be performed to avoid conflicts with other terminals, and there may be terminals with other communication technologies (such as a Wireless Fidelity (WiFi) system) in an unlicensed band; terminals in different systems compete to use transmission resources, which may affect time delay, reliability, or the like of the SL transmission. When the first terminal has SL data to be transmitted, the first terminal may perform carrier selection according to the QoS attribute of the SL data.

In summary, according to the method provided in the embodiment, a carrier is reasonably selected in a SL multi-carrier transmission scenario according to the QoS attribute of the to-be-transmitted SL data. The unlicensed carrier or the licensed carrier is selected according to the QoS attribute of the to-be-transmitted SL data, to adapt to requirements of the SL transmission on aspects such as time delay, reliability, or the like.

Figure 29:
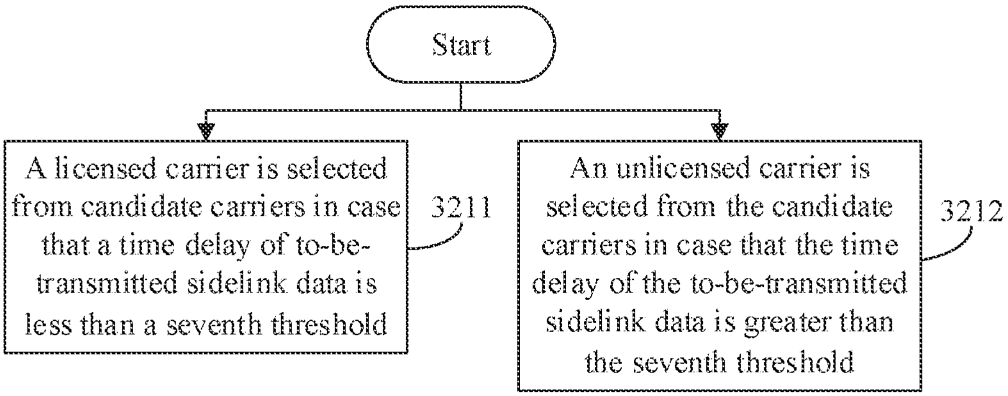
FIG. 29 is a flowchart of a carrier selection method according to an exemplary embodiment of the disclosure.

Eleventh Mode:

FIG. 29 shows a flowchart of a carrier selection method according to an exemplary embodiment of the disclosure. The embodiment is exemplified by the method being executed by a first terminal. The method includes the following operations 3211 and 3212.

At operation 3211, the first terminal selects a licensed carrier from candidate carriers in case that the time delay of to-be-transmitted SL data is less than a seventh threshold.

At operation 3212, the first terminal selects an unlicensed carrier from the candidate carriers in case that the time delay of the to-be-transmitted SL data is greater than the seventh threshold The candidate carriers include the unlicensed carrier and the licensed carrier; and the QoS attribute of the to-be-transmitted SL data includes the time delay.

In case of a service with high requirements on time delay and reliability, the first terminal may use the licensed carrier. In case of a service with a high transmission rate requirement, the first terminal uses the unlicensed carrier. Optionally, a threshold of the time delay is pre-configured or network-configured, and if the required time delay is lower than the threshold, the licensed carrier is used, otherwise, the unlicensed carrier is used.

In summary, according to the method provided in the embodiment, a carrier is reasonably selected in a SL multi-carrier transmission scenario according to the time delay of the SL data. Carrier selection is performed according to the time delay of the to-be-transmitted SL data, the licensed carrier is selected in case that the time delay of the SL data is small, and the unlicensed carrier is selected in case that the time delay of the SL data is large, to adapt to requirements of the SL transmission on aspects of the time delay.

Figure 30:
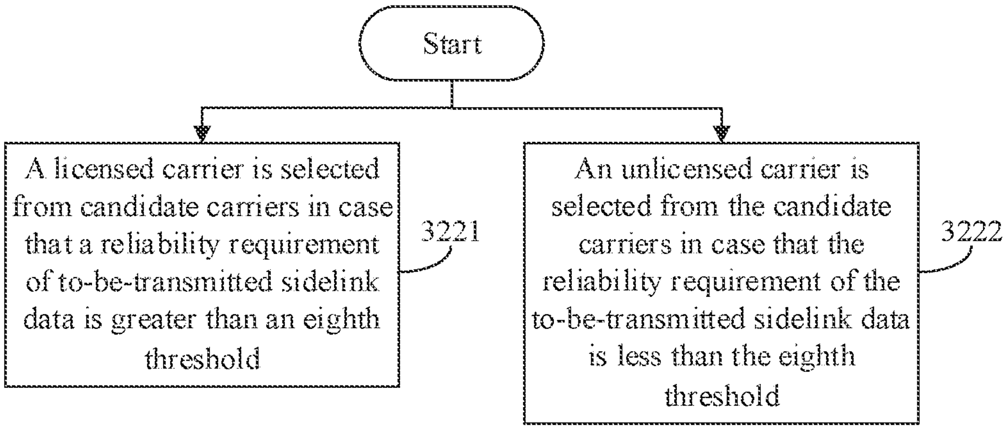
FIG. 30 is a flowchart of a carrier selection method according to an exemplary embodiment of the disclosure.

Twelfth Mode:

FIG. 30 shows a flowchart of a carrier selection method according to an exemplary embodiment of the disclosure. The embodiment is exemplified by the method being executed by a first terminal. The method includes the following operations 3221 and 3222.

At operation 3221, the first terminal selects a licensed carrier from candidate carriers in case that a reliability requirement of to-be-transmitted SL data is greater than an eighth threshold.

At operation 3222, the first terminal selects an unlicensed carrier from the candidate carriers in case that the reliability requirement of the to-be-transmitted SL data is less than the eighth threshold.

The candidate carriers include the unlicensed carrier and the licensed carrier; and the QoS attribute of the to-be-transmitted SL data includes the reliability requirement.

In case of a service with high requirements of the time delay and reliability, the licensed carrier is used, and in case of a service with a high transmission rate requirement, the unlicensed carrier is used.

Optionally, a threshold of the reliability is pre-configured or network-configured, and in case that the required reliability is higher than the threshold, the first terminal uses the licensed carrier, otherwise, the first terminal uses the unlicensed carrier.

In summary, according to the method provided in the embodiment, a carrier is reasonably selected in a SL multi-carrier transmission scenario according to the reliability requirement of the SL data. The licensed carrier is selected in case that the reliability requirement of the SL data is high, and the unlicensed carrier is selected in case that the reliability requirement of the SL data is low, to adapt to requirements of the SL transmission on aspects of the reliability requirement.

Figure 31:
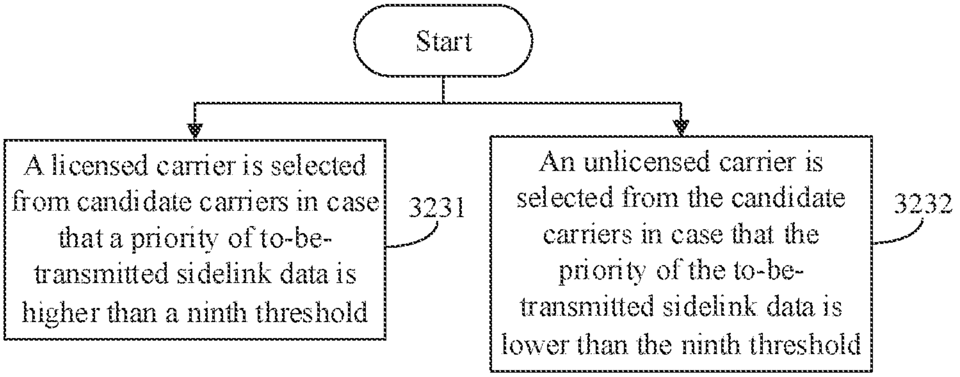
FIG. 31 is a flowchart of a carrier selection method according to an exemplary embodiment of the disclosure.

Thirteenth Mode:

FIG. 31 shows a flowchart of a carrier selection method according to an exemplary embodiment of the disclosure. The embodiment is exemplified by the method being executed by a first terminal. The method includes the following operations 3231 and 3232.

At operation 3231, the first terminal selects a licensed carrier from candidate carriers in case that a priority of to-be-transmitted SL data is higher than a ninth threshold.

At operation 3232, the first terminal selects an unlicensed carrier from the candidate carriers in case that the priority of the to-be-transmitted SL data is lower than the ninth threshold.

For example, the priority of the SL data is a priority indicated by a priority indication information in the SCI, a value of the priority has a range of [0, 7], the higher the value of the priority, the lower the priority; the lower the value of the priority, the higher the priority, that is, priority 0 corresponds to the highest priority, and priority 7 corresponds to the lowest priority.

The candidate carriers include the unlicensed carrier and the licensed carrier; and the QoS attribute of the to-be-transmitted SL data includes the priority.

Optionally, a threshold of the priority is pre-configured or network-configured, and if a value of a priority of a current data is lower than the threshold, the first terminal uses the licensed carrier, otherwise, the first terminal uses the unlicensed carrier; here the lower the value of the priority, the higher the priority.

In summary, according to the method provided in the embodiment, a carrier is reasonably selected in a SL multi-carrier transmission scenario according to the reliability requirement of the SL data. The licensed carrier is selected when the priority of the SL data is high, and the unlicensed carrier is selected when the priority of the SL data is low, to adapt to requirements of the SL transmission on aspects of the priority.

Figure 32:
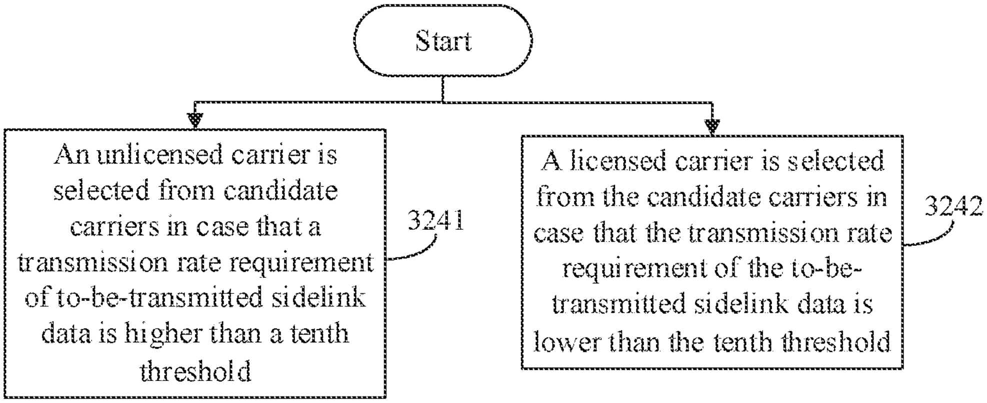
FIG. 32 is a flowchart of a carrier selection method according to an exemplary embodiment of the disclosure.

Fourteenth Mode:

FIG. 32 shows a flowchart of a carrier selection method according to an exemplary embodiment of the disclosure. The embodiment is exemplified by the method being executed by a first terminal. The method includes the following operations 3241 and 3242.

At operation 3241, the first terminal selects an unlicensed carrier from candidate carriers in case that a transmission rate requirement of to-be-transmitted SL data is higher than a tenth threshold.

At operation 3242, the first terminal selects a licensed carrier from the candidate carriers in case that the transmission rate requirement of the to-be-transmitted SL data is lower than the tenth threshold.

The candidate carriers include the unlicensed carrier and the licensed carrier; and the QoS attribute of the to-be-transmitted SL data includes the transmission rate.

The unlicensed carrier is a carrier operating in an unlicensed band, and the licensed carrier is a carrier operating in a licensed band.

Optionally, a threshold of the transmission rate is pre-configured or network-configured, and if the required transmission rate is lower than the threshold, the first terminal uses the licensed carrier, otherwise, the first terminal uses the unlicensed carrier.

In summary, according to the method provided in the embodiment, a carrier is reasonably selected in a SL multi-carrier transmission scenario according to the transmission rate of the SL data. The unlicensed carrier is selected when the transmission rate of the SL data is high, and the licensed carrier is selected when the transmission rate of the SL data is low, to adapt to requirements of the SL transmission on aspects of the transmission rate.

For the condition that the related information of the SL communication includes the UE capability, please refer to the following embodiments.

Figure 33:
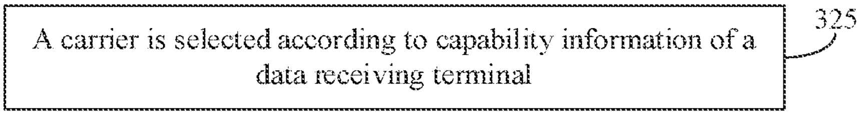
FIG. 33 is a flowchart of a carrier selection method according to an exemplary embodiment of the disclosure.

Fifteenth Mode:

FIG. 33 shows a flowchart of a carrier selection method according to an exemplary embodiment of the disclosure. The embodiment is exemplified by the method being executed by a first terminal. The method includes the following operation 325.

At operation 325, the first terminal selects a carrier according to capability information of a second terminal.

The UE capability includes the capability information of the second terminal.

Exemplarily, the capability information is carried in at least one of following information: a PC5-Radio Resource Control (PC5-RRC), a Media Access Control Control Element (MAC CE), or a SCI.

For example, in unicast communication, UE1 and UE2 form a user pair for unicast communication, and perform interaction of capability information through the PC5-RRC, here, the capability information includes the number of carriers of which simultaneous transmission is supported by the terminal.

In summary, according to the method provided in the embodiment, a carrier is reasonably selected in a SL multi-carrier transmission scenario according to the UE capability. Carrier selection is performed according to capability information of the data receiving terminal, so that the SL transmission meets capability of the data receiving terminal and quality of the SL transmission is ensured.

Figure 34:
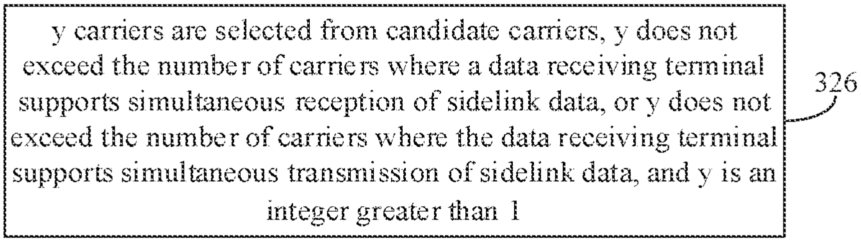
FIG. 34 is a flowchart of a carrier selection method according to an exemplary embodiment of the disclosure.

Sixteenth Mode:

FIG. 34 shows a flowchart of a carrier selection method according to an exemplary embodiment of the disclosure. The embodiment is exemplified by the method being executed by a first terminal. The method includes the following operation 326.

At operation 326, the first terminal selects y carriers from candidate carriers, y does not exceed the number of carriers where a second terminal supports simultaneous reception of SL data, or y does not exceed the number of carriers where the second terminal supports simultaneous transmission of SL data, and y is an integer greater than or equal to 1.

The UE capability includes capability information of the second terminal; and the capability information of the second terminal includes: the number of carriers supporting simultaneous reception of SL data, or the number of carriers supporting simultaneous transmission of SL data.

Optionally, the first terminal receives a SL channel including capability information used to indicate other terminals, and the first terminal performs carrier selection according to the capability information. Optionally, the capability information is used to represent the capability information of the second terminal.

For example, UE1 and UE2 form a user pair for unicast communication, the UE1 supports simultaneous transmission of SL data on two carriers, and the UE2 supports transmission of SL data on one carrier. When the UE1 needs to transmit the SL data to the UE2 and activate SL feedback, the UE1 performs carrier selection, and since the UE2 supports data transmission on only one carrier, if the UE1 selects two carriers to transmit the data simultaneously and data transmissions on the two carriers support the SL feedback, the UE2 needs to perform the SL feedback on the two carriers respectively, which may exceed capability of the UE2, so that the UE2 may select only one of the two carriers to perform the SL feedback and the transmission of the SL feedback on the other carrier is discarded (a situation where SL feedbacks of multiple carriers are transmitted through one carrier is not considered here), which may result in frequent retransmission of data on a carrier where the SL feedback is not received. Therefore, the UE1 may select only one carrier according to the capability of the UE2, to perform data transmission.

For another example, UE1 and UE2 form a user pair for unicast communication, the UE1 supports simultaneous transmission of SL data on two carriers, and the UE2 supports simultaneous reception of SL data on one carrier. When the UE1 needs to transmit the SL data to the UE2, the UE1 performs carrier selection, and since the UE2 supports simultaneous reception of the data on only one carrier, if the UE1 selects two carriers to transmit the data simultaneously, it may exceed capability of the UE2, so that the UE2 may select only one of the two carriers to receive the data and the reception of the SL data on the other carrier is discarded. Therefore, the UE1 may select only one carrier according to the capability of the UE2, to perform data transmission.

In summary, according to the method provided in the embodiment, a carrier is reasonably selected in a SL multi-carrier transmission scenario according to the capability information of the second terminal. Carrier selection is performed according to the number of carriers where the second terminal supports simultaneous reception of SL data or the number of carriers where the second terminal supports simultaneous transmission of SL data, so that the SL transmission meets the capability of the second terminal and quality of the SL transmission is ensured.

Figure 35:
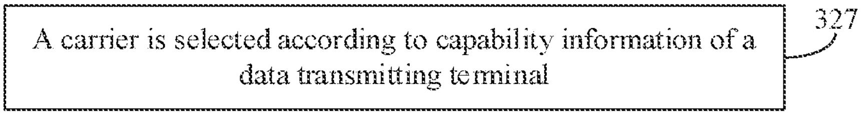
FIG. 35 is a flowchart of a carrier selection method according to an exemplary embodiment of the disclosure.

Seventeenth Mode:

FIG. 35 shows a flowchart of a carrier selection method according to an exemplary embodiment of the disclosure. The embodiment is exemplified by the method being executed by a first terminal. The method includes the following operation 327.

At operation 327, the first terminal selects a carrier according to capability information of the first terminal.

The UE capability includes the capability information of the first terminal.

Exemplarily, the capability information is carried in at least one of following information: a PC5-RRC, a MAC CE, or a SCI.

The first terminal obtains its own capability information from a high layer, and performs carrier selection according to the capability information.

In summary, according to the method provided in the embodiment, a carrier is reasonably selected in a SL multi-carrier transmission scenario according to the UE capability. Carrier selection is performed according to capability information of the data transmitting terminal, so that the SL transmission meets capability of the data transmitting terminal and quality of the SL transmission is ensured.

Eighteenth Mode:

FIG. 36 shows a flowchart of a carrier selection method according to an exemplary embodiment of the disclosure. The embodiment is exemplified by the method being executed by a first terminal. The method includes the following operation 328.

At operation 328, the first terminal selects z carriers from candidate carriers, z does not exceed the number of carriers where the first terminal supports simultaneous transmission of SL data, or z does not exceed the number of carriers where the first terminal supports simultaneous reception of SL data, and z is an integer greater than or equal to 1.

The UE capability includes capability information of the first terminal; and the capability information of the first terminal includes: the number of carriers supporting simultaneous transmission of SL data, or the number of carriers supporting simultaneous reception of SL data.

Optionally, the capability information includes the number N of carriers where the first terminal may support simultaneous transmission of data or simultaneous reception of data. When the first terminal performs carrier selection according to the capability information, the first terminal select no more than N carriers to perform data transmission.

For example, UE1 and UE2 form a user pair for unicast communication, the UE1 supports simultaneous transmission of SL data on two carriers, and when the UE1 needs to transmit the SL data to the UE2, the UE1 performs carrier selection, and the UE1 may select one or two carriers and perform the data transmission simultaneously on the selected carrier(s).

For another example, UE1 and UE2 form a user pair for unicast communication, the UE1 supports simultaneous transmission of SL data on two carriers, but supports simultaneous reception of SL data on only one carrier. When the UE1 needs to transmit the SL data to the UE2 and activates SL feedback, the UE1 performs carrier selection, and if the UE1 selects two carriers to transmit the SL data, the UE2 may perform data feedbacks on the two carriers simultaneously. At this time, since the UE1 may support simultaneous reception of SL data on only one carrier, the UE1 cannot simultaneously receive SL feedbacks transmitted by the UE2 on the two carriers. Therefore, the UE1 may select only one carrier according to capability of the number of carriers where the UE1 simultaneously receives the SL data, to perform transmission of SL data.

In summary, according to the method provided in the embodiment, a carrier is reasonably selected in a SL multi-carrier transmission scenario according to the capability information of the data transmitting terminal. Carrier selection is performed according to the number of carriers where the data transmitting terminal supports simultaneous reception of SL data or the number of carriers where the data transmitting terminal supports simultaneous transmission of SL data, so that the SL transmission meets the capability of the data transmitting terminal and quality of the SL transmission is ensured.

For the condition that the related information of the SL communication includes the carrier set selected by the second terminal, please refer to the following embodiments.

Exemplarily, the second terminal includes at least one of a data receiving terminal of PSSCH or a data receiving terminal of PSFCH. When the second terminal includes the data receiving terminal of the PSSCH, SL data includes to-be-transmitted SL data. When the second terminal includes the data receiving terminal of the PSFCH, the SL data includes SL feedback information.

Nineteenth Mode:

FIG. 37 shows a flowchart of a carrier selection method according to an exemplary embodiment of the disclosure. The embodiment is exemplified by the method being executed by a first terminal. The method includes the following operation 329.

At operation 329, the first terminal selects, from a carrier set selected by a second terminal, a carrier belonging to a subset of the carrier set.

The first terminal may perform carrier selection according to a carrier used by other terminals to perform SL transmission.

For example, UE1 and UE2 form unicast communication, and the two terminals are data receiving terminals with respect to each other, so that carrier selection may be performed according to a carrier used by the other party to perform SL transmission. For example, the system is configured with four carriers, the UE1 uses the carrier 0 and the carrier 1 to perform the SL transmission, the UE2 receives SL data transmitted by the UE1 on the two carriers, and if the UE2 selects the carrier 2 or the carrier 3 to perform the SL transmission, it may induce that the UE2 performs frequent carrier switching since receiving carriers and transmission carriers thereof are different. Therefore, the UE2 may perform carrier selection in the carrier 0 and the carrier 1, thereby avoiding frequent carrier switching.

In summary, according to the method provided in the embodiment, a carrier is reasonably selected in a SL multi-carrier transmission scenario according to the carrier set selected by the data receiving terminal. Carrier selection is performed according to the carrier set selected by the data receiving terminal, so that it is ensured that transmitting carriers and receiving carriers of the data receiving terminal are consistent, and frequent carrier switching is avoided.

For the condition that the related information of the SL communication includes the service type of the to-be-transmitted data, please refer to the following embodiments.

Twentieth Mode:

FIG. 38 shows a flowchart of a carrier selection method according to an exemplary embodiment of the disclosure. The embodiment is exemplified by the method being executed by a first terminal. The method includes the following operation 330.

At operation 330, the first terminal selects a carrier from candidate carriers according to a first correspondence between the service type of the to-be-transmitted data and the carrier.

Correspondences between service types and carriers are configured by a high layer, and the first terminal performs carrier selection according to a service type corresponding to currently to-be-transmitted data and the correspondences. For example, the higher layer is a protocol layer above a physical layer. Configuration made by the higher layer includes configuration made by the protocol layer above the physical layer.

For example, as illustrated in FIG. 39, a service type 1 corresponds to the carrier 0 and the carrier 1; a service type 2 corresponds to the carrier 1, the carrier 2 and the carrier 3; a service type 3 corresponds to the carrier 1 and the carrier 3. When the first terminal needs to perform SL transmission, and when the to-be-transmitted data corresponds to the service type 2, the first terminal selects a carrier from the carrier 1, the carrier 2 and the carrier 3. When the to-be-transmitted data corresponds to the service type 3, the first terminal selects a carrier from the carrier 1 and the carrier 3.

In summary, according to the method provided in the embodiment, a carrier is reasonably selected in a SL multi-carrier transmission scenario according to the correspondences between the service types and the carriers. The corresponding carrier is selected according to the service type, so that the selection of the carrier meets service requirements and quality of the SL transmission is ensured.

For the condition that the related information of the SL communication includes the service attribute of the to-be-transmitted data, please refer to the following embodiments.

Twenty-First Mode:

FIG. 40 shows a flowchart of a carrier selection method according to an exemplary embodiment of the disclosure. The embodiment is exemplified by the method being executed by a first terminal. The method includes the following operation 331.

At operation 331, the first terminal selects an eleventh carrier from candidate carriers, periods supported by the eleventh carrier include a period of to-be-transmitted data.

The service attribute of the to-be-transmitted data includes the period of the to-be-transmitted data.

In NR SL, a periodic service and a non-aperiodic service are supported; in case of the periodic service, the supported service periods include {0, 1: 99, 100, 200, 300, 400, 500, 600, 700, 800, 900, 1000} ms, or the like, and configuration information of a resource pool includes service types and service periods which are supported by the resource pool. When the period value is 0 ms, it represents that the resource pool supports the non-periodic service.

At most 16 supported period values may be configured in a resource pool. When the system is configured with multiple carriers, service periods configured on each carrier and supported by the carrier may be different. For example, the system is configured with two carriers, i.e., a carrier 0 and a carrier 1, here, service periods supported by a resource pool on the carrier 0 include {20, 40, 50, 80} ms; and service periods supported by a resource pool on the carrier 1 include {0, 100, 200, 500, 1000} ms, here 0 ms represents that the resource pool supports the non-periodic service. The first terminal may perform carrier selection according to periodic characteristics of to-be-transmitted SL data. For example, when the to-be-transmitted data has a period of 20 ms, the carrier 0 is selected; when the to-be-transmitted data has a period of 100 ms, the carrier 1 is selected; and when the to-be-transmitted data is a non-periodic service, the carrier 1 is selected In summary, according to the method provided in the embodiment, a carrier is reasonably selected in a SL multi-carrier transmission scenario according to the period of the to-be-transmitted data. The carrier is correspondingly selected according to periodicity of the to-be-transmitted data, so that the period supported by the carrier is matched with the period of the to-be-transmitted data, and quality of the SL transmission is ensured.

For the condition that the related information of the SL communication includes the CBR, please refer to the following embodiments.

Figure 41:
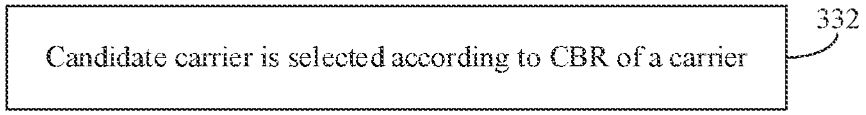
FIG. 41 is a flowchart of a carrier selection method according to an exemplary embodiment of the disclosure.

Twenty-Second Mode:

FIG. 41 shows a flowchart of a carrier selection method according to an exemplary embodiment of the disclosure. The embodiment is exemplified by the method being executed by a first terminal. The method includes the following operation 332.

At operation 332, the first terminal selects a candidate carrier according to CBR of a carrier.

Exemplarily, the first terminal determines carriers with CBRs lower than a CBR threshold as the candidate carriers.

After obtaining the candidate carriers according to the CBRs, the carrier may be selected from the candidate carriers according to any one of the above modes.

Or, the first terminal selects a twelfth carrier from the candidate carriers, CBR of the twelfth carrier is ranked at top w positions from low to high in the candidate carriers, and w is a positive integer.

The CBR is used to reflect a congestion degree of a channel; the higher the CBR, it indicates that the channel is more congested, otherwise, it indicates that the channel is idle. When the first terminal performs carrier selection, the first terminal may perform carrier selection according to the CBR of the carrier. Optionally, the first terminal compares a measured CBR with the CBR threshold, and if the measured CBR is lower than the CBR threshold, the carrier may be used as the candidate carrier, otherwise, the carrier cannot be used as the candidate carrier. Optionally, the first terminal selects carriers from the candidate carriers according to an ascending order of CBRs.

In summary, according to the method provided in the embodiment, a carrier is reasonably selected in a SL multi-carrier transmission scenario according to the CBR of the carrier. A carrier with a low CBR is selected as the candidate carrier according to the CBR of the carrier, then carriers ranked at top few positions are selected according to the ascending order of CBRs, or a carrier is selected from the carriers by other carrier selection modes, so that the selected carrier is a relatively idle carrier, thereby improving quality of the SL transmission.

A carrier is selected according to indication information of other terminals, specifically, please refer to the following embodiments.

Figure 42:
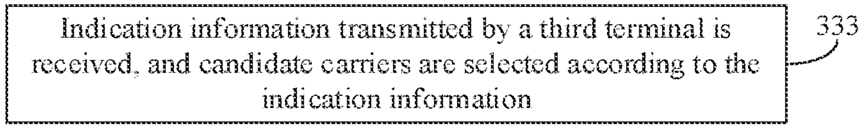
FIG. 42 is a flowchart of a carrier selection method according to an exemplary embodiment of the disclosure.

Twenty-Third Mode:

FIG. 42 shows a flowchart of a carrier selection method according to an exemplary embodiment of the disclosure. The embodiment is exemplified by the method being executed by a first terminal. The method includes the following operation 333.

At operation 333, the first terminal receives indication information transmitted by a third terminal, and selects a carrier according to the indication information.

Optionally, the first terminal receives a SCI transmitted by the third terminal, the SCI carrying the indication information; or the first terminal receives a PC5-RRC signaling transmitted by the third terminal, the PC5-RRC signaling carrying the indication information; or the first terminal receives SL data transmitted by the third terminal, the SL data carrying the indication information, for example, the indication information is carried in a MAC CE of the SL data.

Exemplarily, the third terminal may be a data receiving terminal of the SL data (the second terminal in the above embodiments); or the third terminal may be another terminal different from the first terminal and the second terminal in a communication group, for example, the first terminal and the second terminal belong to the communication group, and the third terminal is a terminal different from the first terminal and the second terminal in this communication group, for example, the third terminal is a header terminal of the communication group.

For example, the first terminal selects candidate carriers according to the indication information transmitted by the third terminal, and selects the carrier from the candidate carriers by any one of the above modes. Or, the first terminal selects candidate carriers by any one of the above modes, and selects the carrier from the candidate carriers according to the indication information transmitted by the third terminal.

Optionally, the indication information includes a carrier index information, and the first terminal selects the carrier according to the carrier index information. For example, the first terminal selects the carrier corresponding to the carrier index information. For example, the system is configured with three carriers, i.e., a carrier 0, a carrier 1 and a carrier 2, and the indication information includes index information of at least one of the three carriers, for example, the indication information includes an index of the carrier 0, and the first terminal selects the carrier 0 according to this indication information.

Optionally, the indication information includes a carrier index information, the first terminal obtains a second correspondence, and the first terminal selects the carrier according to the carrier index information and the second correspondence, here, the second correspondence represents correspondences between pieces of carrier index information and the carriers, and specifically, the correspondences may be pre-configured or network-configured. For example, the system is configured with three carriers, i.e., a carrier 0, a carrier 1 and a carrier 2, and the correspondences between pieces of carrier index information and the carriers are configured by the system as illustrated in Table 2. The second terminal transmits indication information to the first terminal, the indication information includes the carrier index information in Table 2, such as carrier index information 3, and the first terminal selects the carrier 0 and the carrier 1 according to the carrier index information.

TABLE 2 correspondences between pieces of carrier index information and carriers

| Carrier index information | 0 | 1 | 2 | 3 | 4 | 5 | 6 | 7 |
|---|---|---|---|---|---|---|---|---|
| Carrier | carrier 0 | carrier 1 | carrier 2 | carrier 0 and carrier 1 | carrier 1 and carrier 2 | carrier 0 and carrier 2 | carrier 0, carrier 1 and carrier 2 | N/A |

Note: N/A Represents a Reserved Position

In summary, according to the method provided in the embodiment, a carrier is reasonably selected in a SL multi-carrier transmission scenario according to the indication information of other terminals. Carrier selection is performed according to carriers corresponding to the carrier index information in the indication information, so that the carrier used for the SL transmission meets transmission requirements of other terminals and quality of the SL transmission is improved.

In the above embodiments, the first threshold, the second threshold, the third threshold, the fourth threshold, the fifth threshold, the sixth threshold, the seventh threshold, the eighth threshold, the ninth threshold and the tenth threshold are determined according to pre-configured information or network-configured information.

It should be understood that in the above embodiments, the candidate carriers include a carrier set supported by the SL transmission system, or the candidate carriers include a carrier set determined by a preset mode or a preset criterion, or the candidate carriers include a carrier set determined by any one of the above embodiments, which is not limited in the disclosure.

It should be understood that one or more of the above embodiments may be used in combination to perform carrier selection, which is not limited in the disclosure. For example, the system is configured with eight carriers for SL transmission, and a first candidate carrier set is determined according to the service type of the currently to-be-transmitted SL data and the correspondences in the above twentieth mode. Furthermore, a second candidate carrier set is selected from the first candidate carrier set according to whether the logical channel corresponding to the SL data supports SL feedback (i.e., the above first mode), and the terminal selects, from the second candidate carrier set, z carriers (which do not exceed the number of carriers which may be supported by the terminal and where simultaneous transmission of the SL data is performed) to perform the SL data transmission (i.e., the above eighteenth mode). It should be understood that when a plurality of the above embodiments are used in combination, sequences of executing the embodiments are not limited in the disclosure.

Figure 43:
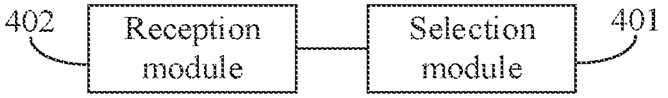
FIG. 43 is a structural block diagram of a carrier selection device according to an exemplary embodiment of the disclosure.

FIG. 43 shows a schematic diagram of a carrier selection device according to an exemplary embodiment of the disclosure. The device may be implemented as a first terminal or part of the first terminal. The device includes a selection module 401 configured to select a carrier according to related information of a SL communication.

In a possible design of the embodiment, the related information of the SL communication includes at least one of:

- configuration information of a PSFCH corresponding to each of candidate carriers,
- a QoS attribute of to-be-transmitted SL data,
- configuration information of a BWP associated with each of the candidate carriers,
- a carrier set selected by a second terminal,
- a UE capability, or
- indication information of a third terminal,
- here, the first terminal is a SL transmitting terminal, the second terminal is a SL receiving terminal, and the third terminal is a terminal other than the first terminal.

In a possible design of the embodiment, the configuration information of the PSFCH corresponding to each of the candidate carriers includes: whether the candidate carrier is configured with a SL feedback resource.

The selection module 401 is configured to select the carrier according to whether the candidate carrier is configured with the SL feedback resource.

In a possible design of the embodiment, the selection module 401 is configured to select a first carrier from the candidate carriers in case that a SL feedback is required by the to-be-transmitted SL data, the first carrier is configured with the SL feedback resource, and

- the selection module 401 is configured to select a second carrier from the candidate carriers in case that the SL feedback is not required by the to-be-transmitted SL data, the second carrier is configured with or not configured with the SL feedback resource.

In a possible design of the embodiment, the QoS attribute of the to-be-transmitted SL data includes a reliability requirement of the to-be-transmitted SL data.

The selection module 401 is configured to select a first carrier from the candidate carriers in case that the reliability requirement of the to-be-transmitted SL data is greater than a first threshold, the first carrier is configured with the SL feedback resource.

In a possible design of the embodiment, the configuration information of the PSFCH corresponding to each of the candidate carriers includes a period of a SL feedback resource.

The selection module 401 is configured to select the carrier according to the period of the SL feedback resource.

In a possible design of the embodiment, the QoS attribute of the to-be-transmitted SL data includes a time delay of the to-be-transmitted SL data.

The selection module 401 is configured to select a third carrier from the candidate carriers in case that the time delay of the to-be-transmitted SL data is less than a second threshold, a period of a SL feedback resource of the third carrier is less than a third threshold.

In a possible design of the embodiment, the configuration information of the PSFCH corresponding to each of the candidate carriers includes the number of SL feedback resources.

The selection module 401 is configured to select the carrier according to the number of SL feedback resources.

In a possible design of the embodiment, the UE capability includes: the number of carriers where the first terminal supports simultaneous transmission of SL data, and the number of carriers where the first terminal supports simultaneous reception of SL data.

The selection module is configured to select the carrier according to the number of SL feedback resources in case that the number of carriers where the first terminal supports simultaneous reception of SL data is greater than the number of carriers where the first terminal supports simultaneous transmission of SL data.

In a possible design of the embodiment, the selection module 401 is configured to select a fourth carrier from the candidate carriers, the number of SL feedback resources of the fourth carrier is greater than a fourth threshold.

In a possible design of the embodiment, the selection module 401 is configured to select the carrier from the candidate carriers according to the number of SL feedback resources in a descending order.

In a possible design of the embodiment, the configuration information of the PSFCH corresponding to each of the candidate carriers includes PSFCH format supported by the candidate carrier.

The selection module 401 is configured to select the carrier according to the PSFCH format supported by the candidate carrier.

In a possible design of the embodiment, the selection module 401 is configured to select a fifth carrier from the candidate carriers, a PSFCH format supported on the fifth carrier is a first format which supports carrying SL feedback information with at most 1 bit.

Or, the selection module 401 is configured to select a sixth carrier from the candidate carriers, a PSFCH format supported on the sixth carrier is a second format which supports carrying SL feedback information with at most m bits, and m is an integer greater than 1.

In a possible design of the embodiment, the configuration information of the BWP associated with each of the candidate carriers includes a numerology. The selection module 401 is configured to select x carriers from the candidate carriers, numerologies corresponding to the x carriers are the same, and x is an integer greater than or equal to 1.

In a possible design of the embodiment, the configuration information of the BWP associated with each of the candidate carriers includes a subcarrier spacing. The selection module 401 is configured to select the carrier from the candidate carriers according to a time delay of the to-be-transmitted SL data and the subcarrier spacing.

In a possible design of the embodiment, the selection module 401 is configured to select a seventh carrier from the candidate carriers in case that the time delay of the to-be-transmitted SL data is less than a fifth threshold, the seventh carrier has a first subcarrier spacing, and the selection module 401 is configured to select an eighth carrier from the candidate carriers in case that the time delay of the to-be-transmitted SL data is greater than the fifth threshold, the eighth carrier has a second subcarrier spacing.

In a possible design of the embodiment, the configuration information of the BWP associated with each of the candidate carriers includes a carrier bandwidth.

The selection module 401 is configured to select the carrier from the candidate carriers according to a data volume of the to-be-transmitted SL data and the carrier bandwidth.

In a possible design of the embodiment, the selection module 401 is configured to: select a ninth carrier from the candidate carriers in case that the data volume of the to-be-transmitted SL data is greater than a sixth threshold, the ninth carrier has a first carrier bandwidth; and select a tenth carrier from the candidate carriers in case that the data volume of the to-be-transmitted SL data is less than the sixth threshold, the tenth carrier has a second carrier bandwidth.

In a possible design of the embodiment, the candidate carriers include an unlicensed carrier and a licensed carrier.

The selection module 401 is configured to select the unlicensed carrier or the licensed carrier from the candidate carriers according to the QoS attribute of the to-be-transmitted SL data.

In a possible design of the embodiment, the QoS attribute of the to-be-transmitted SL data includes a time delay.

The selection module 401 is configured to select the licensed carrier from the candidate carriers in case that the time delay of the to-be-transmitted SL data is less than a seventh threshold, and the selection module 401 is configured to select the unlicensed carrier from the candidate carriers in case that the time delay of the to-be-transmitted SL data is greater than the seventh threshold.

In a possible design of the embodiment, the QoS attribute of the to-be-transmitted SL data includes a reliability requirement.

The selection module 401 is configured to select the licensed carrier from the candidate carriers in case that the reliability requirement of the to-be-transmitted SL data is greater than an eighth threshold, and the selection module 401 is configured to select the unlicensed carrier from the candidate carriers in case that the reliability requirement of the to-be-transmitted SL data is less than the eighth threshold.

In a possible design of the embodiment, the QoS attribute of the to-be-transmitted SL data includes a priority. The selection module 401 is configured to select the licensed carrier from the candidate carriers in case that the priority of the to-be-transmitted SL data is higher than a ninth threshold, and the selection module 401 is configured to select the unlicensed carrier from the candidate carriers in case that the priority of the to-be-transmitted SL data is lower than the ninth threshold.

In a possible design of the embodiment, the QoS attribute of the to-be-transmitted SL data includes a transmission rate requirement.

The selection module 401 is configured to select the unlicensed carrier from the candidate carriers in case that the transmission rate requirement of the to-be-transmitted SL data is higher than a tenth threshold, and the selection module 401 is configured to select the licensed carrier from the candidate carriers in case that the transmission rate requirement of the to-be-transmitted SL data is lower than the tenth threshold.

In a possible design of the embodiment, the UE capability includes capability information of the second terminal.

The selection module 401 is configured to select the carrier according to the capability information of the second terminal.

In a possible design of the embodiment, the capability information of the second terminal includes: the number of carriers supporting simultaneous reception of SL data, or the number of carriers supporting simultaneous transmission of SL data.

The selection module 401 is configured to select y carriers from the candidate carriers, y does not exceed the number of carriers where the second terminal supports simultaneous reception of SL data, or y does not exceed the number of carriers where the second terminal supports simultaneous transmission of SL data, and y is an integer greater than or equal to 1.

In a possible design of the embodiment, the capability information is carried in at least one of following information:

a PC5-RRC, a MAC CE, or a SCI.

In a possible design of the embodiment, the UE capability includes capability information of the first terminal.

The selection module 401 is configured to select the carrier according to the capability information of the first terminal.

In a possible design of the embodiment, capability information of the first terminal includes: the number of carriers supporting simultaneous transmission of SL data, or the number of carriers supporting simultaneous reception of SL data.

The selection module 401 is configured to select z carriers from the candidate carriers, z does not exceed the number of carriers where the first terminal supports simultaneous transmission of SL data, or z does not exceed the number of carriers where the first terminal supports simultaneous reception of SL data, and z is an integer greater than or equal to 1.

In a possible design of the embodiment, the selection module 401 is configured to select, from a carrier set selected by the second terminal, a carrier belonging to a subset of the carrier set.

In a possible design of the embodiment, the selection module 401 is configured to select a carrier from the candidate carriers according to a first correspondence between a service type of the to-be-transmitted data and the carrier.

In a possible design of the embodiment, the service attribute of the to-be-transmitted data includes a period of the to-be-transmitted data. The selection module 401 is configured to select an eleventh carrier from the candidate carriers, periods supported by the eleventh carrier include the period of the to-be-transmitted data.

In a possible design of the embodiment, the selection module 401 is configured to select the carrier according to the indication information transmitted by the third terminal.

In a possible design of the embodiment, the device further includes a reception module 402.

The reception module 402 is configured to receive the indication information transmitted by the third terminal, here, the indication information is carried in a SCI, a PC5-RRC, or a MAC CE.

In a possible design of the embodiment, the indication information transmitted by the third terminal includes a carrier index information.

The selection module 401 is configured to select the carrier according to the carrier index information.

In a possible design of the embodiment, the selection module 401 is configured to select the carrier according to the carrier index information and a second correspondence, here, the second correspondence represents correspondences between pieces of carrier index information and carriers.

Figure 44:
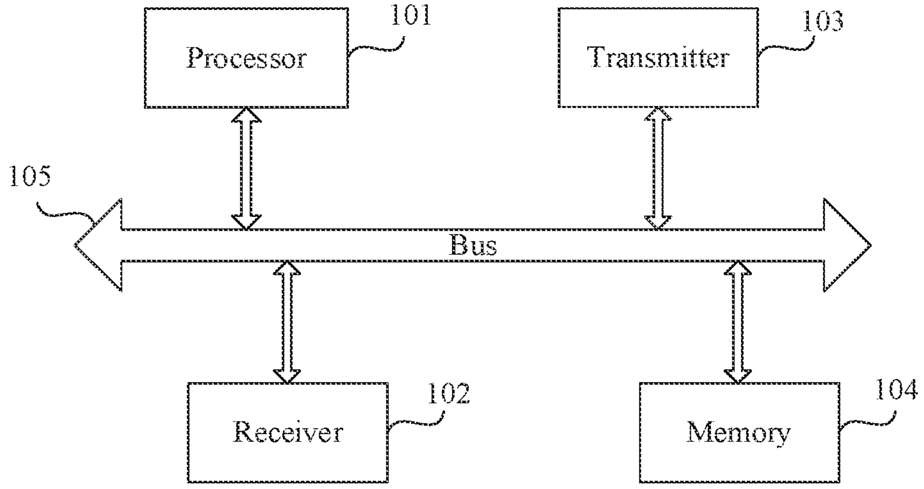
FIG. 44 is a schematic structural diagram of a terminal according to an exemplary embodiment of the disclosure.

FIG. 44 shows a schematic structural diagram of a terminal according to an exemplary embodiment of the disclosure, and the terminal includes a processor 101, a receiver 102, a transmitter 103, a memory 104 and a bus 105.

The processor 101 includes one or more processing cores, and executes various functional applications and information processing by running software programs and modules.

Each of the receiver 102 and the transmitter 103 may be implemented as a communication component, and the communication component may be a communication chip.

The memory 104 is connected to the processor 101 through the bus 105.

The memory 104 may be configured to store at least one instruction, and the processor 101 is configured to execute the at least one instruction to implement each of the operations in the above method embodiments.

The transmitter 103 is configured to perform operations related to transmission; the receiver 104 is configured to perform operations related to reception; and the processor 101 is configured to perform operations other than transmission and reception. Furthermore, the memory 104 may be implemented by any type of volatile or non-volatile storage devices or a combination thereof, and the volatile or non-volatile storage devices include, but are not limited to: a magnetic disk or an optical disk, an Electrically-Erasable Programmable Read Only Memory (EEPROM), an Erasable Programmable Read Only Memory (EPROM), a Static Random Access Memory (SRAM), a Read-Only Memory (ROM), a magnetic memory, a flash memory, and a Programmable Read-Only Memory (PROM).

In an exemplary embodiment, there is further provided a computer-readable storage medium having stored thereon at least one instruction, at least one program segment, a code set or an instruction set. The at least one instruction, the at least one program segment, the code set or the instruction set is loaded and executed by the processor to implement the carrier selection methods provided by the above method embodiments.

In an exemplary embodiment, there is further provided a computer program product or a computer program, including computer instructions. The computer instructions are stored in a computer-readable storage medium, a processor of a computer device reads and executes the computer instructions from the computer-readable storage medium, so that the computer device executes the carrier selection methods described in the above aspects.

It may be understood by those of ordinary skill in the art that implementation of all or part of the operations of the above embodiments may be completed by hardware, or may be completed by a program instructing related hardware, the program may be stored in a computer-readable storage medium, and the above storage medium may be a ROM, a magnetic disk, an optical disc, or the like.

The foregoing are only preferred embodiments of the disclosure, and are not intended to limit the disclosure, and any modification, equivalent replacement, improvement, or the like made within the spirit and principle of the disclosure should be included in the scope of protection of the disclosure.

The invention claimed is:

1. A method for selecting a carrier, comprising:

selecting, by a first terminal, a carrier according to related information of a sidelink communication;

wherein the related information of the sidelink communication comprises configuration information of a Physical Sidelink Feedback Channel (PSFCH) corresponding to each of candidate carriers;

wherein the configuration information of the PSFCH corresponding to each of the candidate carriers comprises a PSFCH format supported by the candidate carrier, wherein the PSFCH format comprises a first format and a second format, the first format supporting carrying sidelink feedback information with at most 1 bit, and the second format supporting carrying sidelink feedback information with at most m bits, m being an integer greater than 1;

wherein selecting, by the first terminal, the carrier according to the related information of the sidelink communication comprises:

selecting, by the first terminal, the carrier according to the PSFCH format supported by the candidate carrier.

2. The method of claim 1, wherein the related information of the sidelink communication further comprises at least one of:

a Quality of Service (QoS) attribute of to-be-transmitted sidelink data, configuration information of a BandWidth Part (BWP) associated with each of the candidate carriers, a carrier set selected by a second terminal, a service attribute of to-be-transmitted data, a User Equipment (UE) capability, or indication information of a third terminal, wherein the first terminal is a sidelink transmitting terminal, the second terminal is a sidelink receiving terminal, and the third terminal is a terminal other than the first terminal.

3. The method of claim 2, wherein the configuration information of the PSFCH corresponding to each of the candidate carriers further comprises: whether the candidate carrier is configured with a sidelink feedback resource, selecting, by the first terminal, the carrier according to the related information of the sidelink communication further comprises:

selecting, by the first terminal, the carrier according to whether the candidate carrier is configured with the sidelink feedback resource.

4. The method of claim 2, wherein the configuration information of the PSFCH corresponding to each of the candidate carriers further comprises a period of a sidelink feedback resource, selecting, by the first terminal, the carrier according to the related information of the sidelink communication further comprises:

selecting, by the first terminal, the carrier according to the period of the sidelink feedback resource.

5. The method of claim 2, wherein the configuration information of the BWP associated with each of the candidate carriers comprises a numerology, selecting, by the first terminal, the carrier according to the related information of the sidelink communication further comprises:

selecting, by the first terminal, x carriers from the candidate carriers, numerologies corresponding to the x carriers being the same, and x being an integer greater than or equal to 1.

6. The method of claim 2, wherein the configuration information of the BWP associated with each of the candidate carriers comprises a subcarrier spacing, selecting, by the first terminal, the carrier according to the related information of the sidelink communication further comprises:

selecting, by the first terminal, the carrier from the candidate carriers according to a time delay of the to-be-transmitted sidelink data and the subcarrier spacing.

7. The method of claim 2, wherein the candidate carriers comprise an unlicensed carrier and a licensed carrier, selecting, by the first terminal, the carrier according to the related information of the sidelink communication further comprises:

selecting, by the first terminal, the unlicensed carrier or the licensed carrier from the candidate carriers according to the QoS attribute of the to-be-transmitted sidelink data.

8. The method of claim 7, wherein the QoS attribute of the to-be-transmitted sidelink data comprises a reliability requirement, selecting, by the first terminal, the unlicensed carrier or the licensed carrier from the candidate carriers according to the QoS attribute of the to-be-transmitted sidelink data comprises:

selecting, by the first terminal, the licensed carrier from the candidate carriers in case that the reliability requirement of the to-be-transmitted sidelink data is greater than an eighth threshold; and selecting, by the first terminal, the unlicensed carrier from the candidate carriers in case that the reliability requirement of the to-be-transmitted sidelink data is less than the eighth threshold.

9. The method of claim 2, wherein selecting, by the first terminal, the carrier according to the related information of the sidelink communication further comprises:

selecting, by the first terminal, the carrier according to the indication information transmitted by the third terminal.

10. The method of claim 9, further comprising:

receiving, by the first terminal, the indication information transmitted by the third terminal, wherein the indication information is carried in a Sidelink Control Information (SCI), a PC5-Radio Resource Control (PC5-RRC), or a Media Access Control Control Element (MAC CE).

11. A device for selecting a carrier, comprising:

a processor; and a memory configured to store processor-executable instructions, wherein the processor is configured to:

select a carrier according to related information of a sidelink communication;

wherein the related information of the sidelink communication comprises configuration information of a Physical Sidelink Feedback Channel (PSFCH) corresponding to each of candidate carriers;

wherein the configuration information of the PSFCH corresponding to each of the candidate carriers comprises a PSFCH format supported by the candidate carrier, wherein the PSFCH format comprises a first format and a second format, the first format supporting carrying sidelink feedback information with at most 1 bit, and the second format supporting carrying sidelink feedback information with at most m bits, m being an integer greater than 1;

wherein the processor is specifically configured to:

select the carrier according to the PSFCH format supported by the candidate carrier.

12. The device of claim 11, wherein the related information of the sidelink communication further comprises at least one of:

a Quality of Service (QoS) attribute of to-be-transmitted sidelink data, configuration information of a BandWidth Part (BWP) associated with each of the candidate carriers, a carrier set selected by a second terminal, a service attribute of to-be-transmitted data, a User Equipment (UE) capability, or indication information of a third terminal, wherein the first terminal is a sidelink transmitting terminal, the second terminal is a sidelink receiving terminal, and the third terminal is a terminal other than the first terminal.

13. The device of claim 12, wherein the configuration information of the PSFCH corresponding to each of the candidate carriers further comprises: whether the candidate carrier is configured with a sidelink feedback resource, the processor is further configured to select the carrier according to whether the candidate carrier is configured with the sidelink feedback resource.

14. The device of claim 12, wherein the configuration information of the PSFCH corresponding to each of the candidate carriers further comprises a period of a sidelink feedback resource, the processor is further configured to select the carrier according to the period of the sidelink feedback resource.

15. The device of claim 12, wherein the configuration information of the BWP associated with each of the candidate carriers comprises a numerology, the processor is further configured to select x carriers from the candidate carriers, numerologies corresponding to the x carriers are the same, and x is an integer greater than or equal to 1.

16. The device of claim 12, wherein the configuration information of the BWP associated with each of the candidate carriers comprises a subcarrier spacing, the processor is further configured to select the carrier from the candidate carriers according to a time delay of the to-be-transmitted sidelink data and the subcarrier spacing.

17. The device of claim 12, wherein the candidate carriers comprise an unlicensed carrier and a licensed carrier, and the processor is further configured to select the unlicensed carrier or the licensed carrier from the candidate carriers according to the QoS attribute of the to-be-transmitted sidelink data.

18. A non-transitory computer-readable storage medium, having stored thereon executable instructions, the executable instructions loaded and executed by a processor to implement a method for selecting a carrier, the method comprising:

selecting, by a first terminal, a carrier according to related information of a sidelink communication;

wherein the related information of the sidelink communication comprises configuration information of a Physical Sidelink Feedback Channel (PSFCH) corresponding to each of candidate carriers;

wherein the configuration information of the PSFCH corresponding to each of the candidate carriers comprises a PSFCH format supported by the candidate carrier, wherein the PSFCH format comprises a first format and a second format, the first format supporting carrying sidelink feedback information with at most 1 bit, and the second format supporting carrying sidelink feedback information with at most m bits, m being an integer greater than 1;

wherein selecting, by the first terminal, the carrier according to the related information of the sidelink communication comprises:

selecting, by the first terminal, the carrier according to the PSFCH format supported by the candidate carrier.

* * * * *